US006408344B1

(12) United States Patent
Sakai

(10) Patent No.: US 6,408,344 B1
(45) Date of Patent: Jun. 18, 2002

(54) METHOD AND APPARATUS FOR FILE TRANSFER AND COMPUTER READABLE RECORDING MEDIUM RECORDING A FILE TRANSFER PROGRAM

(75) Inventor: Tatsuya Sakai, Shijonawate (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/262,347

(22) Filed: Mar. 4, 1999

(30) Foreign Application Priority Data

Mar. 4, 1998 (JP) .......................................... 10-052044

(51) Int. Cl.⁷ .............................. G06F 3/00; G06F 3/06; G06F 13/38; G06F 15/173; G06F 17/00
(52) U.S. Cl. .............................. 710/20; 710/30; 710/36; 710/62; 710/72; 707/1; 707/6; 707/10; 707/522; 707/523; 709/100; 709/200; 709/216; 709/217; 709/218; 709/219; 709/223; 709/225; 709/232; 709/301; 709/303; 709/304
(58) Field of Search .................. 707/1, 6, 10, 522–524, 707/526, 528, 529; 709/100, 200, 201, 213, 216–219, 223–225, 232, 300, 301–305; 710/15, 16, 17, 20, 30, 36, 62, 72, 73, 74

(56) References Cited

U.S. PATENT DOCUMENTS

| | | | | |
|---|---|---|---|---|
| 5,303,343 A | * | 4/1994 | Ohya et al. ................... 709/246 |
| 5,333,299 A | * | 7/1994 | Koval et al. ................... 713/400 |
| 5,339,413 A | * | 8/1994 | Koval et al. ................... 709/300 |
| 5,475,836 A | * | 12/1995 | Harris et al. ................... 709/301 |
| 5,487,167 A | * | 1/1996 | Dinallo et al. ................. 395/807 |
| 5,491,813 A | * | 2/1996 | Bondy et al. ................... 709/301 |
| 5,513,365 A | * | 4/1996 | Cook et al. .................... 710/72 |
| 5,546,541 A | * | 8/1996 | Drew et al. .................. 709/240 |
| 5,680,618 A | * | 10/1997 | Freund .......................... 707/7 |
| 5,727,212 A | * | 3/1998 | Dinallo ........................ 709/301 |
| 5,802,511 A | * | 9/1998 | Kouchi et al. ................. 707/2 |
| 5,842,211 A | * | 11/1998 | Horadan et al. .............. 707/10 |
| 5,903,890 A | * | 5/1999 | Shoji et al. .................... 707/3 |
| 5,911,078 A | * | 6/1999 | Anderson .................... 710/268 |
| 5,915,131 A | * | 6/1999 | Knight et al. ................ 345/333 |
| 6,065,012 A | * | 5/2000 | Balsara et al. ............... 707/102 |
| 6,157,959 A | * | 12/2000 | Bonham et al. ............ 709/300 |
| 6,236,997 B1 | * | 5/2001 | Bodamer et al. ............. 707/10 |

FOREIGN PATENT DOCUMENTS

JP 4-313126 5/1992

* cited by examiner

Primary Examiner—Christopher B. Shin
Assistant Examiner—Tanh Q Nguyen
(74) Attorney, Agent, or Firm—Nixon & Vanderhye P.C.

(57) ABSTRACT

A computer has one or more different device drivers, and one or more different devices are connected through respective device drivers. The devices to be connected include a storage device or an information processing device. In the computer, a file inside or outside of the computer is accessed in response to an access request generated inside. In the computer, based on data type of the file, which one of the device driver is to be used for the delivery of the file is determined. When a device driver used for the delivery of the file is specified among one or more device drivers as a result of determination, the file is transferred through the specified device driver to the unit connected to the device driver. Therefore, when a file is accessed in response to a request generated in the computer, the accessed file is automatically transferred and delivered to that device which requires the file, among one or more devices connected to the computer.

26 Claims, 28 Drawing Sheets

FIG. 4

OTi

| NM: name | CN: defined contents |
|---|---|
| MV: member variable | |
| DevType | (device type) 0: storage device, 1: processing device |
| DevNo | position on Assign Table |
| STi | file selection table |
| .extname | extension |
| .transfilename | file conversion program name |
| .rel_aplname | related application name |
| suportdevname | object device name or driver name |
| cfilecnt | save file counter (initial value = 0) |
| cfilebuf | saved file name storing area |
| cmatchp | position on STi corresponding to saved file |
| MF: member function | |
| void Initialize() | initialization routine called when the object is configured ... initialization of variable, declaration of use of the device (open) etc. |
| void Close() | terminating process routine called when the object is eliminated ... declaration of non-use of the device (close) etc. |
| BOOL FileCheck() | check routine for determining whether the file is an object of transfer |
| BOOL CheckDev() | check routine for determining whether the device is connected |
| void PlagIn() | device connection management routine |
| void Convert() | file converting process routine |
| void OutPut() | process routine for transferring file to the device |
| void OutPut2() | saving of transfer data when the device is not connected (processing device only) |
| void AplOutPut() | process routine for transferring application to the device |

| No | extname | transfilename | rel_aplname |
|---|---|---|---|
| 0 | ".wp" | NULL | C:¥APL¥WPVIEW.EXE |
| 1 | ".txt" | NULL | C:¥APL¥TEXTVIEW.EXE |
| 2 | NULL | NULL | NULL |
| 3 | NULL | NULL | NULL |

| No | extname | transfilename | rel_aplname |
|---|---|---|---|
| 0 | ".wp" | NULL | NULL |
| 1 | ".txt" | C:¥TOOLS¥WPCNV.EXE | NULL |
| 2 | NULL | NULL | NULL |
| 3 | NULL | NULL | NULL |

| No | extname | transfilename | rel_aplname |
|---|---|---|---|
| 0 | ".wp" | NULL | NULL |
| 1 | ".upf" | C:¥TOOLS¥JPGCNV.EXE | NULL |
| 2 | ".txt" | NULL | NULL |
| 3 | ".adr" | NULL | NULL |

| No | extname | transfilename | rel_aplname |
|---|---|---|---|
| 0 | ".wp" | NULL | NULL |
| 1 | ".txt" | NULL | NULL |
| 2 | NULL | NULL | NULL |
| 3 | NULL | NULL | NULL |

| No | extname | transfilename | rel_aplname |
|---|---|---|---|
| 0 | ".upf" | NULL | NULL |
| 1 | ".adr" | C:¥TOOLS¥ADRCNV.EXE | NULL |
| 2 | NULL | NULL | NULL |
| 3 | NULL | NULL | NULL |

| No | extname | transfilename | rel_aplname |
|---|---|---|---|
| 0 | ".upf" | NULL | NULL |
| 1 | ".adr" | C:¥TOOLS¥ADRCNV.EXE | NULL |
| 2 | NULL | NULL | NULL |
| 3 | NULL | NULL | NULL |

| No | extname | transfilename | rel_aplname |
|---|---|---|---|
| 0 | ".wp" | NULL | C:¥APL¥WPVIEW.EXE |
| 1 | ".txt" | NULL | C:¥APL¥TEXTVIEW.EXE |
| 2 | NULL | NULL | NULL |
| 3 | NULL | NULL | NULL |

| No | extname | transfilename | rel_aplname |
|---|---|---|---|
| 0 | ".upf" | NULL | NULL |
| 1 | NULL | NULL | NULL |
| 2 | NULL | NULL | NULL |
| 3 | NULL | NULL | NULL |

| No | extname | transfilename | rel_aplname |
|---|---|---|---|
| 0 | ".wp" | C:¥PRNT¥WPPRNT.EXE | NULL |
| 1 | ".upf" | C:¥PRNT¥UPFPRNT.EXE | NULL |
| 2 | ".txt" | C:¥PRNT¥TXTPRNT.EXE | NULL |
| 3 | ".adr" | C:¥PRNT¥ADRPRNT.EXE | NULL |

| No | output device name devname | expected use | assigned output object name OutPutObj |
|---|---|---|---|
| 0 | A | FD for PC | PCFD |
| 1 | B | FD for WP | WPFD |
| 2 | C | for system | NULL |
| 3 | D | for work | NULL |
| 4 | E | for work | NULL |
| 5 | F | for work | NULL |
| 6 | COM1 | for transfer to PDA | PDAS |
| 7 | COM2 | for transfer to digital camera | DGCAM |
| 8 | LPT1 | for transfer to printer | PRINT |

FIG.8

| global variable name | defined contents |
|---|---|
| OTi | output object list prepared in the apparatus |
| OutPutObjCnt | number of output object prepared in the apparatus |
| AT(i) | output object name list assigned to respective output driver |
| AssignTableBack | work area for copying of AT(i) |
| DevCnt | number of output drivers provided to the device |
| urlname | area for storing accessed URL (file path) name |
| filename | area for storing file name of accessed file |
| matchp | position on STi where extension matches |
| readbuf | buffer for reading access file |

| FD duplication (backup) process for designated extension ... (PCFD) | | | |
|---|---|---|---|
| DevNo | set at the time of initialization | | |
| DevType | 0 (storage device) | cfilecnt | variable (initial value = 0) |
| STi | ST0 | cfilebuf[] | variable (initial value = NULL) |
| suportdevname | "A", "B" | cmatchp[] | variable (initial value = 0) |
| void Initialize() | "initializing process of output object of storage device": F1 | | |
| void Close() | no process (return only) | | |
| BOOL FileCheck() | "file selecting process": F8 | | |
| BOOL CheckDev() | no process (return only) | | |
| void PlagIn() | no process (return only) | | |
| void Convert() | "file converting process": F9 | | |
| OutPut() | "duplicating process (normal)": F10 | | |
| OutPut2() | no process (return only) | | |
| AplOutPut() | "related application duplicating process": F11 | | |

| FD duplicating (backup) process for word processor file ... (WPFD) | | | |
|---|---|---|---|
| DevNo | set at the time of initialization | | |
| DevType | 0 (storage device) | cfilecnt | variable (initial value = 0) |
| STi | ST1 | cfilebuf[] | variable (initial value = NULL) |
| suportdevname | "A", "B" | cmatchp[] | variable (initial value = 0) |
| void Initialize() | "initializing process of output object of storage device": F1 | | |
| void Close() | no process (return only) | | |
| BOOL FileCheck() | "file selecting process": F8 | | |
| BOOL CheckDev() | no process (return only) | | |
| void PlagIn() | no process (return only) | | |
| void Convert() | "file converting process": F9 | | |
| OutPut() | "duplicating process (with format)": F12 | | |
| OutPut2() | no process (return only) | | |
| AplOutPut() | "related application duplicating process": F11 | | |

| HD duplication (backup) process for all read access files ... (PCHD1) | | | |
|---|---|---|---|
| DevNo | set at the time of initialization | | |
| DevType | 0 (storage device) | cfilecnt | variable (initial value = 0) |
| STi | ST2 | cfilebuf[] | variable (initial value = NULL) |
| suportdevname | "D:", "E:", "F:" | cmatchp[] | variable (initial value = 0) |
| void Initialize() | "initializing process of output object of storage device": F1 | | |
| void Close() | no process (return only) | | |
| BOOL FileCheck() | "file selecting process": F8 | | |
| BOOL CheckDev() | no process (return only) | | |
| void PlagIn() | no process (return only) | | |
| void Convert() | "file converting process": F9 | | |
| OutPut() | "duplicating process (normal)": F10 | | |
| OutPut2() | no process (return only) | | |
| AplOutPut() | "related application duplicating process": F11 | | |

| HD duplicating (backup) process for designated extension ... (PCHD2) |
|---|
| contents are the same as output object table OT2 except STi = ST3 |

| transfer process to PDA connected through serial device ... (PDAS) | | | |
|---|---|---|---|
| DevNo | set at the time of initialization | | |
| DevType | 1 (processing device) | cfilecnt | variable (initial value = 0) |
| STi | ST4 | cfilebuf[] | variable (initial value = NULL) |
| suportdevname | "COM1:" | cmatchp[] | variable (initial value = 0) |
| void Initialize() | "initializing process of output object of processing device": F2<br>• initialization of variables<br>• open process (declaration of use) of output driver<br>• setting activation of "connection monitoring process" | | |
| void Close() | "object terminating process of processing device": F14<br>• close process (declaration of non-use) of output driver<br>• close process of "connection monitoring process" | | |
| BOOL FileCheck() | "file selecting process": F8 | | |
| BOOL CheckDev() | "connection determining process": F5 | | |
| void PlagIn() | "connection monitoring process": F3 | | |
| void Convert() | "file converting process": F9 | | |
| OutPut() | "transfer process": F4 | | |
| OutPut2() | "saving process": F6 | | |
| AplOutPut() | "related application transfer process": F7 | | |

| transfer process to PDA connected through IR device ... (PDAIR) |
|---|
| contents are the same as output object table OT4 except suportdevname = "COM2:", STi = ST5 |

| transfer process to PDA not capable of handling image file, connected through serial device ... (PDA-S2) |
|---|
| contents are the same as output object table OT4 except STi = ST6 |

| transfer process to digital camera connected through IR device ... (DGCAM) |
|---|
| contents are the same as output object table OT4 except suportdevname = "COM2:", STi = ST7 |

| transfer process to printer ... (PRINT) |
|---|
| contents are the same as output object table OT4 except suportdevname = "LPT1:", STi = ST8 |

INITIALIZING PROCESS OF ALL OUTPUT OBJECTS: F1

INITIALIZING PROCESS OF OUTPUT OBJECT OF STORAGE DEVICE: F1

INITIALIZING PROCESS OF OUTPUT OBJECT FOR PROCESSING DEVICE: F2

FILE CONVERTING PROCESS: F9

FIG.29 OUTPUT OBJECT TABLE CHANGING PROCESS: F13

PROCESS FOR TERMINATING ALL OUTPUT OBJECTS: FE

PROCESS FOR TERMINATING OUTPUT OBJECT OF PROCESSING DEVICE: F14

METHOD AND APPARATUS FOR FILE TRANSFER AND COMPUTER READABLE RECORDING MEDIUM RECORDING A FILE TRANSFER PROGRAM

BACKGROUND OF THE INVENTION

1. Field of the Invention

The present invention relates to method and apparatus for file transfer for transferring a file accessed for reading (hereinafter simply referred to as accessed) in a unit to another unit, and to a computer readable recording medium recording a file transfer program. More specifically, the present invention relates to method and apparatus for file transfer for automatically transferring an accessed file to a connected another unit, and to a computer readable recording medium storing the file transfer program.

Here, a file refers to a minimum unit of a resource addressed by a resource providing side.

2. Description of the Background Art

Conventionally, a technique referred to as "cache" for high speed accessing of a file provided by a server computer at a client computer through a communication network has been known and disclosed, for example, in Japanese Patent Laying-Open No. 4-313126.

In "cache" technique, an accessed file is stored in a hard disc of a client computer or in a hard disc of an alternate server (referred to as a gate way computer in the aforementioned Laid-Open Application) provided between the client computer and the communication network, and when there is an access request to the same file thereafter in the client computer, the stored content of the hard disc is accessed. This allows faster file access between the client computer and the server computer.

The function of the above described "cache" has been developed only for the purpose of increasing the speed of accessing to the same file the next time and thereafter. Therefore, the accessed file is not automatically transferred to various information units connected directly to the client computer, and file transfer has been done by manual operation of a user.

For this manual operation, it has been necessary for the user to determine to which connected information unit the accessed file is to be transferred and perform file transfer operation in accordance with the result of determination file by file. Such file transfer operation is troublesome and prone to mistakes.

SUMMARY OF THE INVENTION

An object of the present invention is to provide method and apparatus for file transfer allowing transfer and delivery of a file accessed in response to a request generated in the apparatus to that one of a plurality of units connected to the apparatus which requires the file, and to provide a computer readable recording medium recording a file transfer program.

The method of file transfer in accordance with the present invention is applied to an apparatus having one or more different device drivers and one or more different units connected through respective device drivers for delivering files to the one or more units through corresponding device drivers respectively, characterized by the following steps: a file access step for accessing a file in response to an access request generated in the apparatus; and a file delivery step for delivering, when it is determined for each of the one or more device drivers that the device driver is used for the delivery of the file accessed in the file access step, the file accessed in the access step to that unit which is connected through the device driver.

Therefore, when a file is accessed in the file access step in response to the access request generated in the apparatus, the accessed file is delivered in the file delivery step through the device driver used for the delivery of the file, to the unit connected thereto.

Therefore, when the file is accessed in response to an access request in the apparatus, the accessed file is automatically transferred to that unit which needs the file, without any operation by the user. Accordingly, files required by respective units can be transferred at high speed and erroneous transfer process by manual operation is avoided, and therefore process efficiency in transferring the accessed file to the unit requiring the file is improved.

In the above described method of file transfer, the step of file delivery may include a device driver determining step for determining, for each of the one or more device drivers, based on the data type of the file accessed in the file access step, whether the device driver is the one used for delivery of the file.

By the device driver determining step, the device driver which is used for file delivery, namely the unit requiring delivery of the file, can be easily determined based on the data type of the accessed file. Accordingly, without any operation by the user, among the files accessed in response to access requests in the apparatus, only the corresponding files required by respective ones of the plurality of units can be selected and automatically transferred and delivered in accordance with the types of data required.

The apparatus to which the above described file transfer method is applied further has a file selection table storing, for each of the one or more device drivers, data type of files of which delivery is requested by the unit connected to the device driver. The above described device driver determining step may be adapted such that for each of the one or more device drivers, when the data type of the file accessed in the file access step is stored in the corresponding file selection table, the device driver is determined to be that device driver which is used for delivery of the file.

Therefore, the unit requiring the file accessed in the file access step can be determined in accordance with the content of the file selection table, and the file can be transferred and delivered thereto. Accordingly, in accordance with the contents set in the file selection table, the unit which is the destination of delivery of the file accessed in the file access step can easily be determined.

The apparatus to which the above described file transfer method is applied further has a delivery procedure table storing, for each of the one or more device drivers, the procedure of delivering the file to the unit connected to the device driver. The file delivery step may be adapted such that in accordance with the content of the delivery procedure table corresponding to that device driver which has been determined in the device driver determining step to be the device driver used for the delivery of the file accessed in the file access step, the file is delivered to the unit connected to the device driver.

Accordingly, delivery of the file accessed in the file access step to each unit in the file delivery step is performed in accordance with the delivery procedure in the delivery procedure table provided for each of the one or more device drivers, that is, for each unit. Therefore, it is possible to easily transfer and deliver the file, which is the object of delivery, to each unit simply in accordance with the delivery procedure in the delivery procedure table.

The above described objects of the present invention is attained by the file transfer device having one or more different device drivers and one or more units connected through respective device drivers, for delivering files to the one or more units using corresponding device drivers respectively, characterized by a file access section for accessing a file in response to an access request generated in the apparatus, and a file delivery section. The file delivery section delivers, when it is determined for each of the one or more device drivers that the device driver is the one used for delivery of the file accessed by the file access section, the accessed file to that unit which is connected through the device driver.

Therefore, when a file is accessed by the file access section in response to an access request generated in the apparatus, the accessed file is delivered through the device driver used for the delivery of the file to the unit connected thereto, by the file delivery section.

Therefore, when the file is accessed in response to an access request in the apparatus, the accessed file is automatically transferred to the unit requiring the file, without any operation by the user. Therefore, the file required by each unit can be transferred at high speed and erroneous transfer procedure caused by manual operation is avoided. Therefore, the processing efficiency for transferring the accessed file to the unit requiring the file is improved.

In the file transfer apparatus, the file delivery section may include a device driver determining section. The device driver determining section determines, for each of the one or more device drivers, that the device driver is the one used for delivery of the file in accordance with the data type of the file accessed by the file access section.

Therefore, it is possible for the device driver determining section to easily determine the device driver used for file delivery, that is, the unit requiring delivery of the file, based on the data type of the accessed file. Accordingly, without any operation by the user, of the files accessed in response to access request in the apparatus, only the files corresponding to the necessary data type are selected and automatically transferred and delivered at high speed to respective ones of the plurality of units.

The file transfer apparatus may be configured in the following manner. More specifically, the apparatus further has a file selection table storing, for each of the one or more device drivers, the data type of the file of which delivery is requested by a unit connected to the corresponding device driver. The device driver determining section determines, for each of the one or more device drivers, when the data type of the file accessed by the file access section is stored in the corresponding file selection table, that the device driver is the one used for the file delivery.

Therefore, the unit requiring the file accessed by the file access section can be determined in accordance with the content of the file selection table, and the file can be transferred and delivered thereto. Accordingly, the unit which is the destination of delivery of the file accessed by the file access section can easily be determined in accordance with the contents set in the file selection table.

The file transfer apparatus may be configured in the following manner. More specifically, the apparatus further has a delivery procedure table storing, for each of the one or more device drivers, the procedure of file delivery to the unit connected to the corresponding device driver. The file delivery section delivers, in accordance with the content of the delivery procedure table corresponding to the device driver which is determined to be the device driver determining section to be that device driver which is used for the delivery of the file accessed by the file access section, the file to the unit connected to the corresponding device driver.

Therefore, delivery of the file accessed by the file access section to each unit by the file delivery section is performed in accordance with the delivery procedure in the delivery procedure table provided for respective ones of the one or more device drivers, that is, for respective units. Therefore, the file which is the object of delivery can be easily transferred and delivered to respective units simply in accordance with the delivery procedure of the delivery procedure table.

In the above described file transfer apparatus, the aforementioned one or more units include one or more input/output units for inputting/outputting information or one or more storage units for storing information, and the one or more device drivers may include one or more input/output device drivers connecting the apparatus to one or more input/output units, or one or more storage device drivers for connecting the apparatus to one or more storage units.

Therefore, as the unit connected to the apparatus and to which the file is delivered, the input/output unit for inputting/outputting information or the storage unit for storing information is connected.

Accordingly, it is possible to deliver the contents of the file accessed by the file access section to the input/output unit and to externally output (display or print), and to receive input corresponding thereto, or it is possible to store and save the contents of the accessed file in the storage unit. Accordingly, as series of procedures including access to the files, delivery of the accessed files to various units and processing of the file contents in various units can be performed at high speed.

The file transfer apparatus may be configured in the following manner. The delivery procedure of the delivery procedure table corresponding to the storage device driver includes a duplication process procedure for duplicating the file in the storage unit connected to the storage device deliver, and the delivery procedure of the delivery procedure table corresponding to the input/output device driver includes a transfer process procedure for transferring the file to the input/output unit connected to the input/output device driver.

Accordingly, to the storage unit or the input/output unit connected to the apparatus, the accessed file is duplicated or transferred to the storage unit or the input/output unit connected to the apparatus, in accordance with the duplication procedure or transfer process procedure in the delivery procedure table. Accordingly, it is possible to deliver the file while flexibly coping with the format (type) for duplication to the storage unit or the format (type) of input/output unit connected to the apparatus in accordance with the duplication process procedure or the transfer process procedure in the duplication procedure table. Therefore, limitation of the format (type) related to the input/output unit or the storage unit as the destination of file delivery is relaxed.

In the above described file transfer apparatus, the file delivery section may further include a connection determining section and a file saving section. The connection determining section determines whether an input/output unit is connected to that input/output device driver which corresponds to the device driver determined by the device driver determining section to be the device driver used for file delivery. When it is determined by the connection determining section that the connection is not established, the file saving section duplicates and saves the data related to the file accessed by the file access section in the storage unit connected to the storage device driver in accordance with the duplication process procedure corresponding to the prescribed storage device driver.

Accordingly, when it is determined by the connection determining section that the input/output unit which is the object of file delivery is not connected to the apparatus, the data related to the file is duplicated and saved by the file saving section in a storing unit corresponding to a prescribed storage device driver. Therefore, it is not necessary that the unit as the object of file delivery to be always connected to the apparatus. This increases degree of freedom of the connection of the unit to the apparatus.

The transfer apparatus may be configured in the following manner. When an input/output unit is connected to one or more input/output device drivers among one or more device drivers, the file accessed by the file access section corresponding to the data saved by the file saving section is transferred through the device driver in accordance with the corresponding transfer process procedure to the input/output unit.

Therefore, of the file accessed while the input/output unit is not connected, when that file of which delivery is requested by the input/output unit is accessed, the accessed file is temporarily saved by the file saving section and thereafter, when the input/output unit is connected, the file is delivered to the input/output equipment. Therefore, it is possible to access the file required by the input/output unit and deliver file surely to the input/output unit no matter whether the input/output unit is connected or not. This ensures file transfer to the unit.

In the file transfer apparatus, the file delivery section further includes an application file delivery section. When the file is delivered, the application file delivery section transfers the file together with an application file related to processing of the file as needed, through a device driver determined by the device driver determining section, to the unit connected to the device driver.

Therefore, when accessed file is delivered to each unit, an application file related to processing of the file is also delivered by the application file delivery section. Therefore, a unit having the accessed file and the related application file can be provided by itself separate from the apparatus, allowing flexible use of the unit.

In the file transfer apparatus, the file delivery section may be configured to convert, when the file is delivered, the content or format of the file to a prescribed content or format as needed.

Therefore, the accessed file is converted in advance to the prescribed content or format as needed and thereafter delivered to each unit. Therefore, it is possible to deliver a file of one data type with its contents or format converted to be suitable for the unit as the destination of delivery. Therefore, processing efficiency of the file in each unit as the destination of file delivery is improved.

In the file transfer apparatus, the file access section may be so configured as to access at least a file inside or outside the apparatus in response to an access request.

Therefore, the files access section accesses a file inside the apparatus and a file outside the apparatus. Therefore, the object of access can be extended from the files inside the apparatus to files outside the apparatus, for example files provided through a communication network. Therefore, various and many files can be delivered to various units, improving versatility of contents to be processed by the units.

In the file transfer apparatus, the contents of at least one of the delivery procedure table and the file selection table corresponding to the one or more device drivers may be made arbitrarily changeable by external operation.

Therefore, the contents of the delivery procedure table and the contents of the file selection table may be changed to be suitable for the device driver by external operation, for each device driver. Accordingly, the contents of each device driver can be changed in accordance with the type of the unit connected to the device driver, for example, the type of the unit to be connected is not limited, and therefore file delivery to various types of units is possible.

In the file transfer apparatus, the data type mentioned above may be indicated by information contained in an identifier for specifying the file to be accessed by the file access section.

Therefore, the data type of the file accessed by the file access section is recognized by the information contained in the identifier for specifying the file. This facilitates determination of the data type of the accessed file, and hence improves efficiency of file delivery to each unit.

The above described objects can be attained by a computer readable recording medium recording a file transfer program in accordance with the present invention, which program is to cause a computer to execute the method of file transfer. The method of file transfer is applied to an apparatus having one or more different device drivers and one or more different units connected through respective device drivers, for delivering a file to each of the one or more units through the corresponding device driver. The method of file transfer includes a file access step for accessing a file in response to an access request generated in the apparatus, and a file delivery step. In the file delivery step, for each of the one or more device drivers, when it is determined that the device driver is the one used for delivery of the file accessed in the file access step, the file accessed in the file access step is delivered to that unit which is connected through the device driver.

Therefore, when a file is accessed in the file access step in response to the access request generated in the apparatus, the accessed file is delivered through the device driver used for the delivery of the file in the file delivery step, to the unit connected thereto.

Therefore, without any operation by the user, when the file is accessed in response to an access request in the apparatus, the accessed file is automatically delivered to the unit which requires the file.

Therefore, files required by respective units can be transferred and delivered at high speed, erroneous file delivery caused by erroneous operation by the user is avoided, and processes for delivering files required by respective units can be done efficiently.

The file delivery step in the method of file transfer executed by the file transfer program recorded on the recording medium may include a device determining step for determining, for each of the one or more device drivers, based on data type of the file accessed in the file access step, that the device driver is the one used for the delivery of the accessed file.

Therefore, the device driver used for the de livery of the accessed file, that is, the unit requiring the delivery of the file is readily determined in the device driver determining step based on the data type of the file. Accordingly, without any operation by the user, only those of the files accessed in response to the access request in the apparatus, which correspond to the required data type are transferred and delivered at high speed to respective units.

The method of file transfer executed by the file transfer program recorded on the aforementioned recording medium may be adapted in the following manner. More specifically, the apparatus further has a file selection table storing, for each one of the one or more device drivers, data type of the file of which delivery is requested by a unit connected to the device driver. Here, in the aforementioned device driver selection step, for each of the one or more device drivers, when the data type of the file accessed in the file access step is stored in the corresponding file selection table, it is determined that the corresponding device driver is the one used for the delivery of the file.

Therefore, it is possible to determine a unit requiring the file accessed in the file access step in accordance with the content of the file selection table, and to transfer and deliver the file. Accordingly, based on the contents set in the file selection table, the unit which is the destination of delivery of the file accessed in the file access step can be determined easily, and therefore file delivery to respective units can be done at high speed.

The method of file transfer executed by the file transfer program recorded on the aforementioned recording medium may be adapted in the following manner. More specifically, the apparatus further has a delivery procedure table storing, for each of the one or more device drivers, the procedure of delivering the file to the unit connected to the corresponding device driver. Here, in the above described file delivery step, the file is delivered in accordance with the contents of the delivery procedure table corresponding to the device driver determined in the device driver determining step to be the one used for the delivery of the accessed file, the file to the unit connected to the corresponding device driver.

Therefore, the delivery of the files accessed in the file access step to respective units is performed in accordance with the delivery procedure of the delivery procedure table provided for each of the one or more device drivers, that is, for each unit. Therefore, it is possible to deliver accessed files to respective units simply in accordance with the contents of the deliver procedure table. This enables high speed delivery of the files to respective units.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 shows, in the form of a table, configuration (class) of an output Obj (object) in accordance with an embodiment of the present invention.

FIGS. 5A to 5E show exemplary configurations of file selection table STi in accordance with an embodiment of the present invention.

FIGS. 6A to 6D show exemplary configurations of file selection table STi in accordance with an embodiment of the present invention.

FIG. 7 shows an exemplary configuration of an Assign table AT(i) in accordance with an embodiment of the present invention.

FIG. 8 shows, in the form of a table, a plurality of global variables used in a series of process procedures in computer 1 for transferring accessed files to a storage device group or a processing device group to be stored or processed, in accordance with an embodiment of the present invention.

FIGS. 9A and 9B show examples of contents of output Obj table OTi in accordance with an embodiment of the present invention.

FIGS. 10A and 10B show examples of contents of output Obj table OTi in accordance with an embodiment of the present invention.

FIGS. 11A to 11E show examples of contents of output Obj table OTi in accordance with an embodiment of the present invention.

DESCRIPTION OF THE PREFERRED EMBODIMENTS

Figure 1:
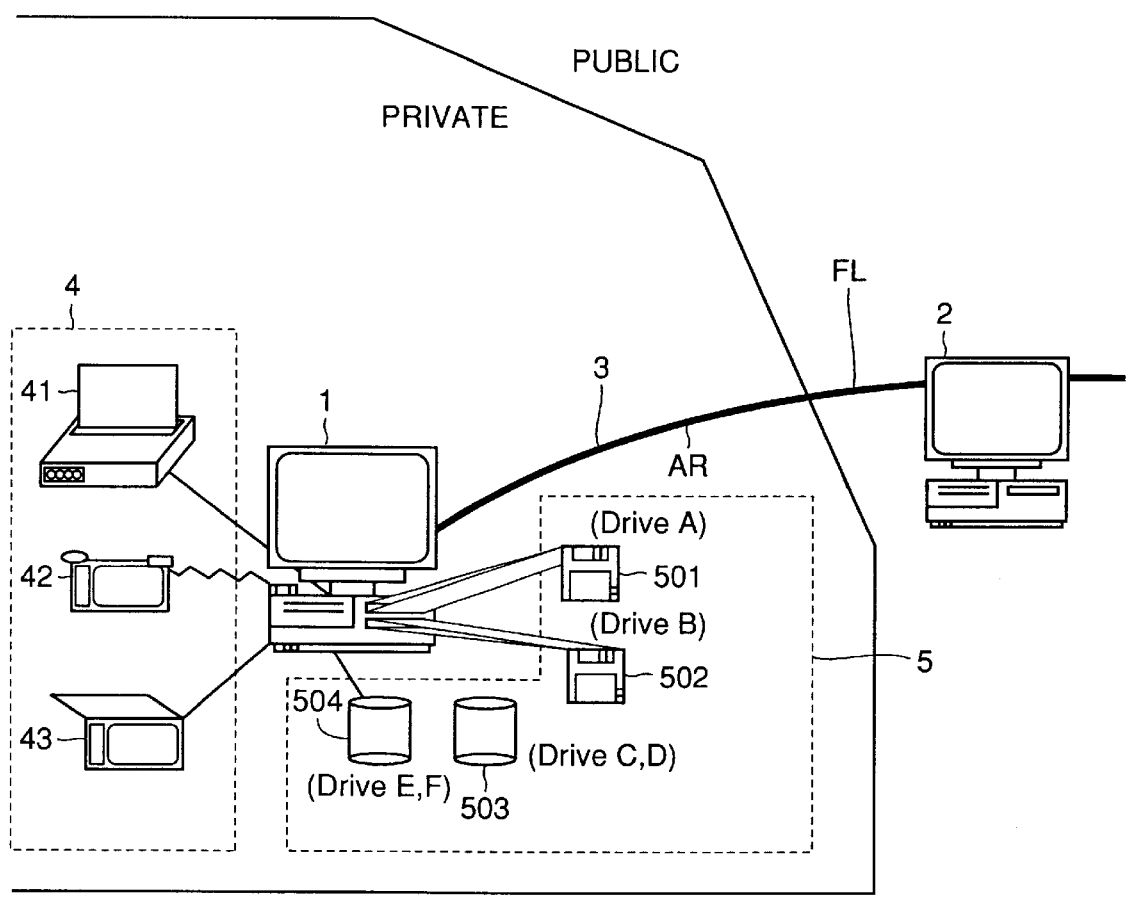
FIG. 1 shows an overall configuration of the file access system in accordance with an embodiment of the present invention.

Embodiments of the present invention will be described in the following. In the file access system in accordance with an embodiment of the present invention shown in FIG. 1, a private computer 1, for example, is connected to a public server 2 through a communication circuit 3 such as LAN (Local Area Network) or a telephone circuit. To computer 1, a processing device group 4 for processing data transferred from computer 1 and a storage device group 5 for storing data transferred from computer 1 are connected.

The processing device group 4 includes a printer 41, a digital camera 42 and a PDA (Personal Digital Assistants) 43. The storage device group 5 includes an FDD (Flexible Disk Driver) 501 identified by a storage driver name A, a FDD502 identified by a storage driver name B, an HDD (Hard Disc Driver) 503 contained in computer 1 and identified by storage driver name C or D, and an HDD504 external to computer 1 and identified by storage driver name E or F.

Storage device group 5 includes a unit for storing data, and a unit for storing audio data or image data may be included. In the example shown in FIG. 1, computer 1 transmits a file access request AR to a server 2, transfers and delivers a file FL received from server 2 or a file FL accessed in accordance with file access request AR inside computer 1 to a unit among the processing device group 4 or a unit among the storage device group 5 requesting the file, so that the file is processed or stored therein.

Figure 2:
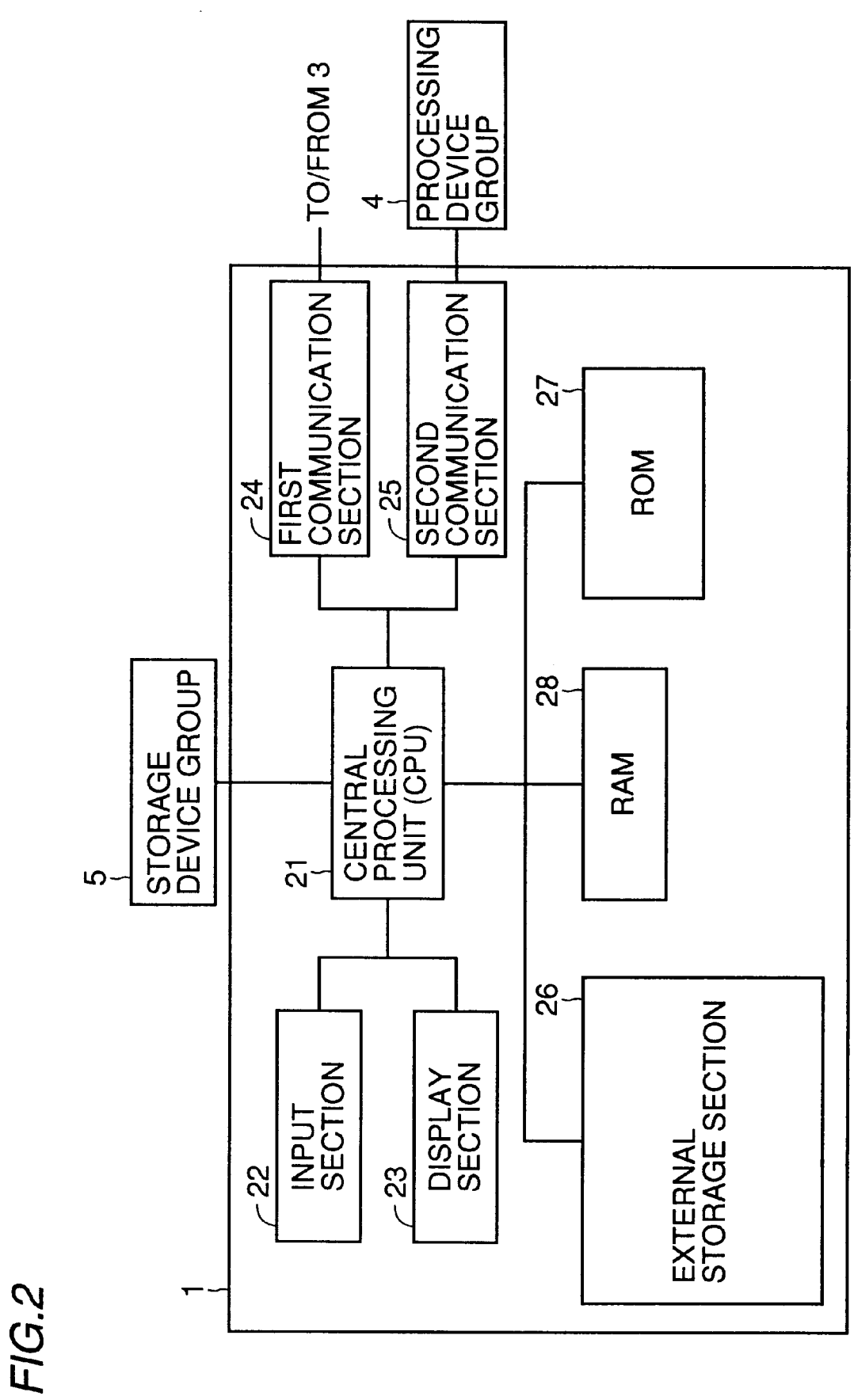
FIG. 2 is a block diagram of internal hardware of computer 1 shown in FIG. 1.

FIG. 2 is a block diagram of internal hardware of computer 1 shown in FIG. 1. Referring to FIG. 2, computer 1 includes a central processing unit 21 consisting of a CPU, an input section 22 represented by a keyboard, for example, a display section 23 for displaying data, a first communication section 24 for connecting a communication circuit 3 with computer 1, a second communication section 25 including a plurality of communication devices for connecting processing device group 4 with computer 1, an external storage section 26 including an HD (Hard Disc), an ROM27 and an RAM28.

Figure 3:
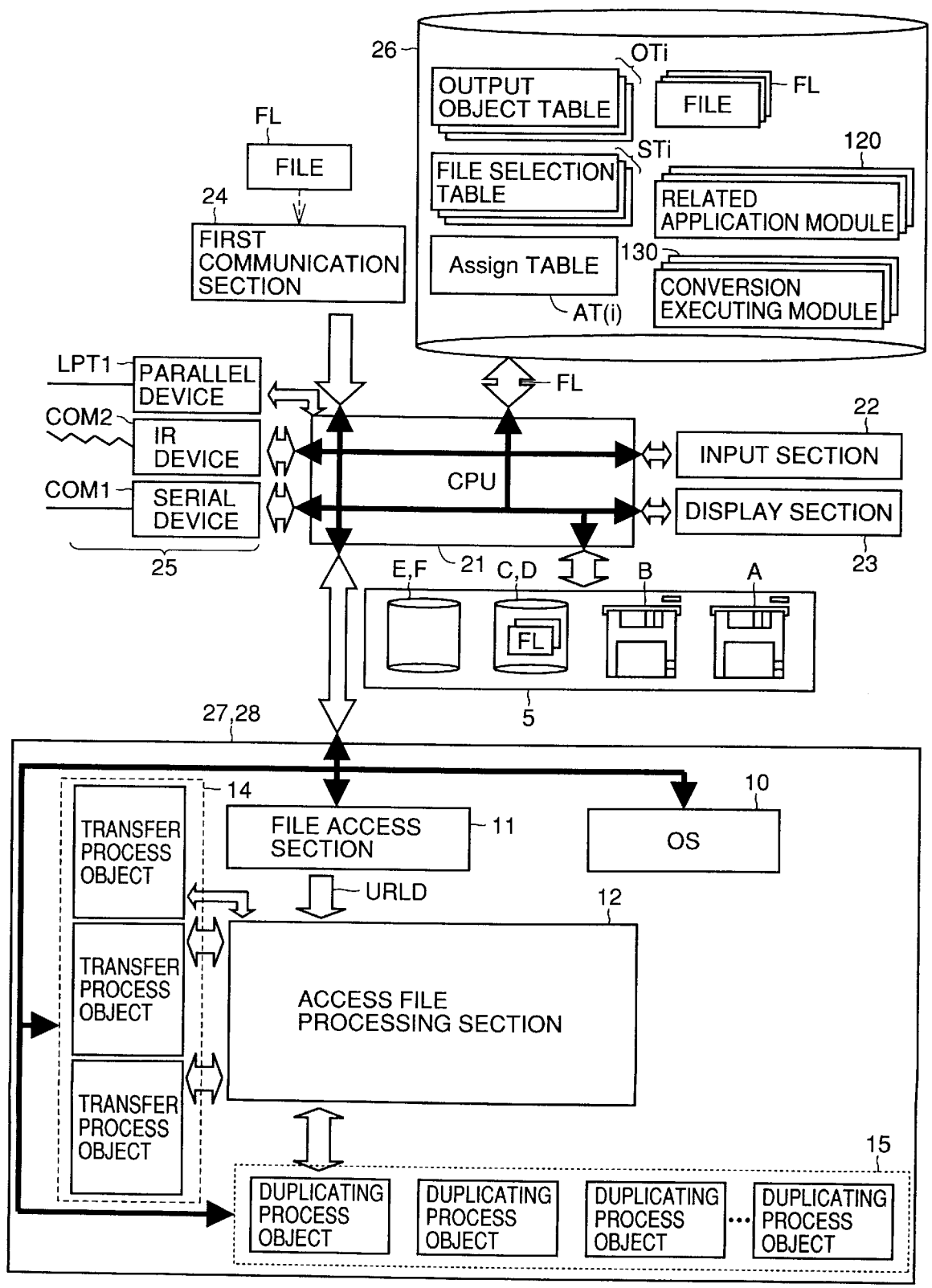
FIG. 3 shows software functional configuration of computer 1 shown in FIG. 1 and hardware configuration shown in FIG. 2 related to each other.

FIG. 3 shows software functional configuration of computer 1 shown in FIG. 1 and hardware configuration shown in FIG. 2 related to each other. In FIG. 3, thick arrows represent flow of data, while thin arrows represent flow of control. Referring to FIG. 3, second communication section 25 includes, as a communication device for connecting units among processing device group 4 to CPU21, a parallel device LPT1, an IR (infrared) device COM2 for digital camera 42, and a serial device COM1 such as RS232C for PDA43.

External storage section 26 stores a plurality of files FL to be accessed by CPU2 1 and transferred to storage device group 5 or processing device group 4, a plurality of related application modules 120 and a plurality of conversion executing modules 130, which will be described later, as well as an output object tables OTi (i=0, 1, 2, . . . , 8), file selection tables STi and an Assign table AT(i). Here, the object includes data code representing a series of process procedures.

Referring to FIG. 3, ROM27 or RAM28 includes, in order to select a unit requiring the file FL from processing device group 4 or storage device group 5 and to transfer the file FL to the selected unit for processing or storage, an OS (operating system) 10 for centralized management and control of computer 1, a file access section 11, an access file processing section 12, a transfer processing object group 14 including a plurality of transfer processing objects and a duplication processing object group 15 including a plurality of duplication processing objects. Transfer processing objects are provided for respective communication devices of the second communication section 25, and duplication processing objects are provided for respective storage drivers of storage device group 5.

In the following description, each of the duplicate processing object and transfer processing object will be referred to as an output object, and the communication devices and the storage devices will be referred to as output devices. The output object tables OTi and file selection tables STi of external storage section 26 are provided corresponding to these output objects respectively.

In response to a file access request AR generated in computer 1 including request of an application program or a timer interruption in computer 1, file access section 11 accesses various files FL in external storage section 26 or files provided from server 2 through first communication section 24 and communication circuit 3, and applies data (including file name) of the accessed file to access file processing section 12. As the file name, data URLD of URL (Uniform Resource Locator) indicating the storage location of the file FL is used. As the URL consists of a protocol name, host name (server name) and a directory name (or file name), it is possible to access the file FL in response to the file access request AR using the data URLD of the URL, and in addition, it is possible to extract the file name of the accessed file FL from the data URLD of the URL.

Access file processing section 12 selectively generates, calls and activates an output object assigned to each output device, referring to Assign table AT(i) in external storage section 26.

Thereafter, based on the data attribute (data type) of the file FL indicated by the extension of the file name of the file FL, by each output object, the data related to the file FL is stored or transferred and delivered to a unit among the storage device group 5 or among the processing device group 4 which requires the data of the file FL.

Though the data type of the file FL is determined based on the extension of the file name in the present embodiment, the method is not limited thereto, and the file type may be determined by directly referring to the contents of the file FL.

The number of devices which may be connected to computer 1 is, in the present embodiment, up to 9 as shown in FIG. 1 or 3.

FIG. 4 shows, in the form of a table, configuration (class) of output object in accordance with an embodiment of the present invention, especially the basic configuration of output object table OTi shown in FIG. 3. In the output object table OTi of FIG. 4, a plurality of member variables MV used in the output object and corresponding variable name NM and defined contents CN are given and, in addition, a plurality of member functions MF used in the output object and corresponding function names NM and defined process contents CN are given.

FIGS. 5A to 5E and GA to 6D show exemplary configurations of file selection tables STi in accordance with an embodiment of the present invention. As can be seen from the figures, each of the file selection tables STi corresponding to respective output devices include, corresponding to the plurality of extensions extname indicative of the data types of accessed files FL, a file converting program name trans filname indicative of a name of conversion executing module 130 for converting the contents or format of the data of the corresponding file FL to allow processing by the respective processing device connected to the output device or storage in the corresponding storage device, as well as a related application name rel_aplname indicative of an application module 120 related to data processing of the file FL.

In the present embodiment, it is assumed that the data types of the files represented by the extension extname is up to four. For example, extension extname of ".wp" represents a file storing data to be accessed by a word processor, a file with ".up f" represents a file storing image data, a file with ".txt" represents a file storing text data and a file with ".adr" represents a file storing address data. In the figure, NULL represents that there is no data allocation. The number of data types of files FL is not limited to this example.

FIG. 7 shows an exemplary configuration of Assign table AT(i) in accordance with an embodiment of the present invention. The contents of Assign table AT(i) are set at the time of initialization of computer 1, for example.

Assign table AT(i) includes records corresponding to respective ones of the output devices connected to computer 1 of FIG. 3. In each record, the name devname of the corresponding output device, expected use and name of the assigned output object OutPutObj are stored.

Here, output device A is used for an FD of computer (PC) 1, output device B is used for the FD of a word processor (WP), output device C is used for the HD of the system shown in FIG. 1, and output devices D to F are used for the HD for working. Output devices COM1, COM2 and LPT1 are used for data transfer to PDA43, digital camera 42 and printer 41, respectively.

As can be seen from FIG. 1 or 3, the number of output devices connected to computer 1 is at most 9, and therefore Assign table AT(i) includes 9 records.

In Assign table AT(i) of FIG. 7, if the output object name OutPutObj is NULL, it means that the output object is not assigned to the corresponding output device, and hence it represents that no process is performed for delivery of the accessed file FL on that output device.

FIG. 8 shows, in the form of a table, a plurality of global variables used in a series of process procedures by computer 1 for transferring the accessed file to the storage device group to be stored or to the processing device group to be processed, in accordance with an embodiment of the present invention. FIG. 8 shows the names and defined contents of respective ones of the plurality of global variables. The global variables are stored in advance in RAM28.

Referring to FIG. 8, the variable OTi represents a list of output object table prepared by computer 1; the variable OutPutObj Cnt represents the number of output objects prepared by computer 1; the variable AT(i) represents the list of output object names assigned to the plurality of output devices; the variable AssignTableBack represents a work area for copying of Assign table AT(i); the variable DevCnt represents the total number of output devices prepared in computer 1; the variable uriname represents an area for storing URL names of the accessed files FL; the variable filename represents an area for storing file names of the accessed file FL; the variable matchp represents a position in file selection table ST(i) corresponding to the extension of the accessed files FL; and the variable readbuf represents a buffer for reading contents of the accessed file FL.

The contents of output object table OTi of FIG. 4 are defined in accordance with the corresponding output object. In FIG. 4, the variable DevType represents whether the device corresponding to the output object in question is the storage device or the processing device by "0" or "1", and the variable DevNO represents the corresponding position of the output object in Assign table AT(i) shown in FIG. 7. Further, the variable STi represents a file selection table corresponding to the output object.

The variable suportdevname represents the output device name corresponding to the output object. The variable cfilecnt represents a counter counting the file FL saved and stored in a prescribed storage area. The variable cfilebuf represents an area storing the name of the file FL saved and stored in the prescribed storage area. The variable cmatchp represents the position in the file selection table STi corresponding to the file FL saved and stored in the prescribed storage area.

Further, the function Initialize ( ) represents an initialization routine which is read when the corresponding output object is created, for performing initialization of variables and the process for declaring use of the output device (open). The function FileCheck ( ) is a routine for determining whether an accessed file FL is to be transferred to the processing device group 4 or to the storage device group 5. The function CheckDev ( ) is a routine for determining whether a processing device is connected to computer 1 or not. The function PlagIn ( ) represents a routine for monitoring connection of a processing device to computer 1. The function OutPut ( ) is a process routine for transferring and delivering a file FL to the storage device or the processing device, and the function OutPut2 ( ) is a routine for temporarily saving, when a processing device as a destination of a file FL is not yet connected to computer 1, the file to a prescribed storage area. The function AplOutPut ( ) is a process routine for transferring and delivering an application module 120 related to file FL together with the file FL to the storage device or the processing device.

The process routines represented by respective member functions will be described later with reference to flow charts of the processes.

FIGS. 9A and 9B, 10A and 10B and 11A to 11E show exemplary contents of output object tables OTi in accordance with an embodiment of the present invention. Contents set in respective output object tables are in accordance with the contents defined in the configuration of the output object table shown in FIG. 4. Therefore, only a brief description will be given.

The output object table OT0 shown in FIG. 9A is applied to an output object for copying (backup) a file FL having a designated extension to an FD, in which "0" representing a storage device is set in the variable DevType, "A" or "B" is set in the variable suportdevname, the variable STi is set to refer to the file selection table ST0 of FIG. 5A. As to other variables, initial values as shown in the figure are set when the output object table OT0 is initialized.

Functions Initialize ( ),FileCheck ( ),Convert ( ),OutPut( ) and AplOutPut ( ) are set such that initializing process F1, file selecting process F8, file converting procedure F9, duplicating process (normal) F10 and related application duplicating process F11 are executed respectively. For functions close ( ), CheckDev ( ), PlangIn ( ) and OutPut2 ( ), simply the return process is performed.

The output object table OT1 of FIG. 9B is applied to an output object for copying (backup) a file created by a word processor (referred to a word processor file hereinafter) to an FD, and "A" or "B" is set in the variable suportdevname and the variable STi is set to refer to the file selection table ST1 of FIG. 5B. Other variables are set in the same manner as in youtput object table OT0 shown in FIG. 9A.

The function OutPut ( ) is set such that a duplicating process (with format) F12, which will be described later, is executed. Other functions are set in the similar manner as in output object table OT0 of FIG. 9A.

The output object table OT2 of FIG. 10A is applied to an output object for copying to the HD (backup) all the accessed files, "D" or "E" or "F" is set in the variable suportdevname, and the variable STi is set to refer to the file selection table ST2 of FIG. 5C. Other variable are set in the similar manner as in operation object table OT0 of FIG. 9A. As to the functions, all functions are set in the similar manner as in output object table OT0 of FIG. 9A.

The output object table OT3 of FIG. 10B is applied to an output object for copying to the HD (backup) a file FL corresponding to a designated extension, and the variable STi is set to refer to the file selection table ST3 of FIG. 5D. Other variables and all functions are set in the similar manner as in output object table OT2 of FIG. 10A.

Output object tables OT4 to OT8 of FIGS. 11A to 11E are provided corresponding to the plurality of output objects for the processing device group 4. The output object table OT4 of FIG. 11A is applied to an output object for transferring and delivering a file FL to PDA43 connected to serial device COM1, "1" representing an output device corresponding to the processing device is set in the variable DevType, "COM1" is set in the variable suportdevname, and the variable STi is set to refer to the file selection table ST4 of FIG. 5E. Other variables are set in the similar manner as the output object table OT0 shown in FIG. 9A.

Functions Initialize ( ),close ( ), FileCheck ( ), CheckDev( ), PlagIn, Convert ( ), OutPut ( ), OutPut2 ( ) and AplOutPut ( ) are set such that initializing process F2, terminating process F14 for the object of the processing device, file selecting process F8, connection determining process F5, connection monitoring process F3, file converting process F9, transfer process F4, saving process F6 and related application transfer process F7 are executed, respectively.

In the initializing process F2 mentioned above, initialization of variables, the process for opening the communication device (declaration of use) and activation of a program in accordance with the connection monitoring process F3, which will be described later, are set. In the process F14 for terminating an output object of the processing device, the process for closing the output device (declaration of non-use) and a close process of the connection monitoring process F3, which will be described later, are executed.

The output object table OT5 of FIG. 11B is applied to an output object for performing a process of file transfer to PDA43 connected to IR device COM2, "COM2" is set in the variable suportdevname and the variable STi is set to refer to the file selection table ST5 of FIG. 6A. Other settings are the same as those of output object table OT4 described above.

The output object table OT6 of FIG. 11C is applied to an output object for a process of file transfer to PDA43 not allowing use of an image file, connected to serial device COM1. The variable STi is set to refer to the file selection table ST6 of FIG. 6B. Other settings are the same as those of output object table OT4 described above.

The output object table OT7 of FIG. 11D is applied to an output object for the process of file transfer to digital camera 42 connected to IR device COM2. "COM2" is set in the variable suportdevname, and the variable STi is set to refer to the file selection table ST7 of FIG. 6C. Other settings are the same as those of output object table OT4 described above.

The output object table OT8 of FIG. 11E is applied to an output object of file transfer to a printer 41 connected to parallel device LPT1, "LPT1" is set in the variable suportdevname, and the variable STi is set to refer to the file selection table ST8 of FIG. 6D. Other settings are the same as those of output object table OT4 described above.

Figure 12:
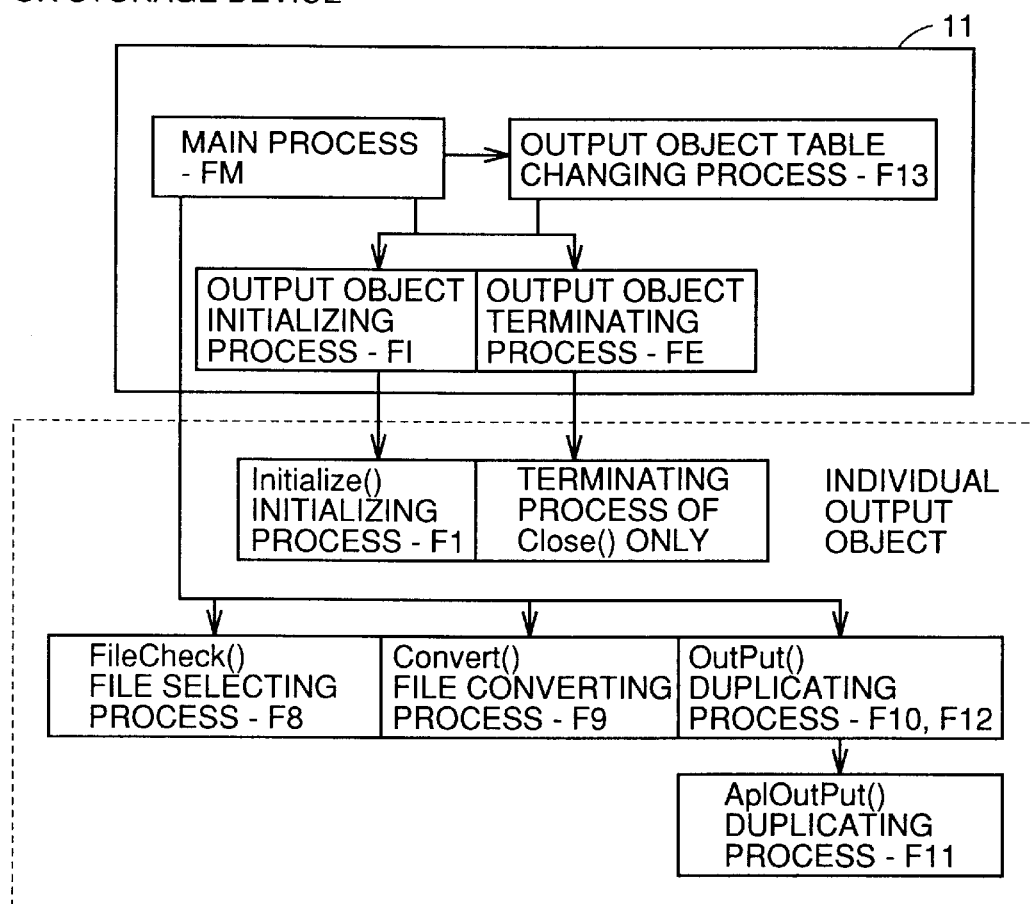
FIG. 12 shows a function calling relation when an accessed file is to be stored in a storage device group 5 in accordance with an embodiment of the present invention.
Figure 13:
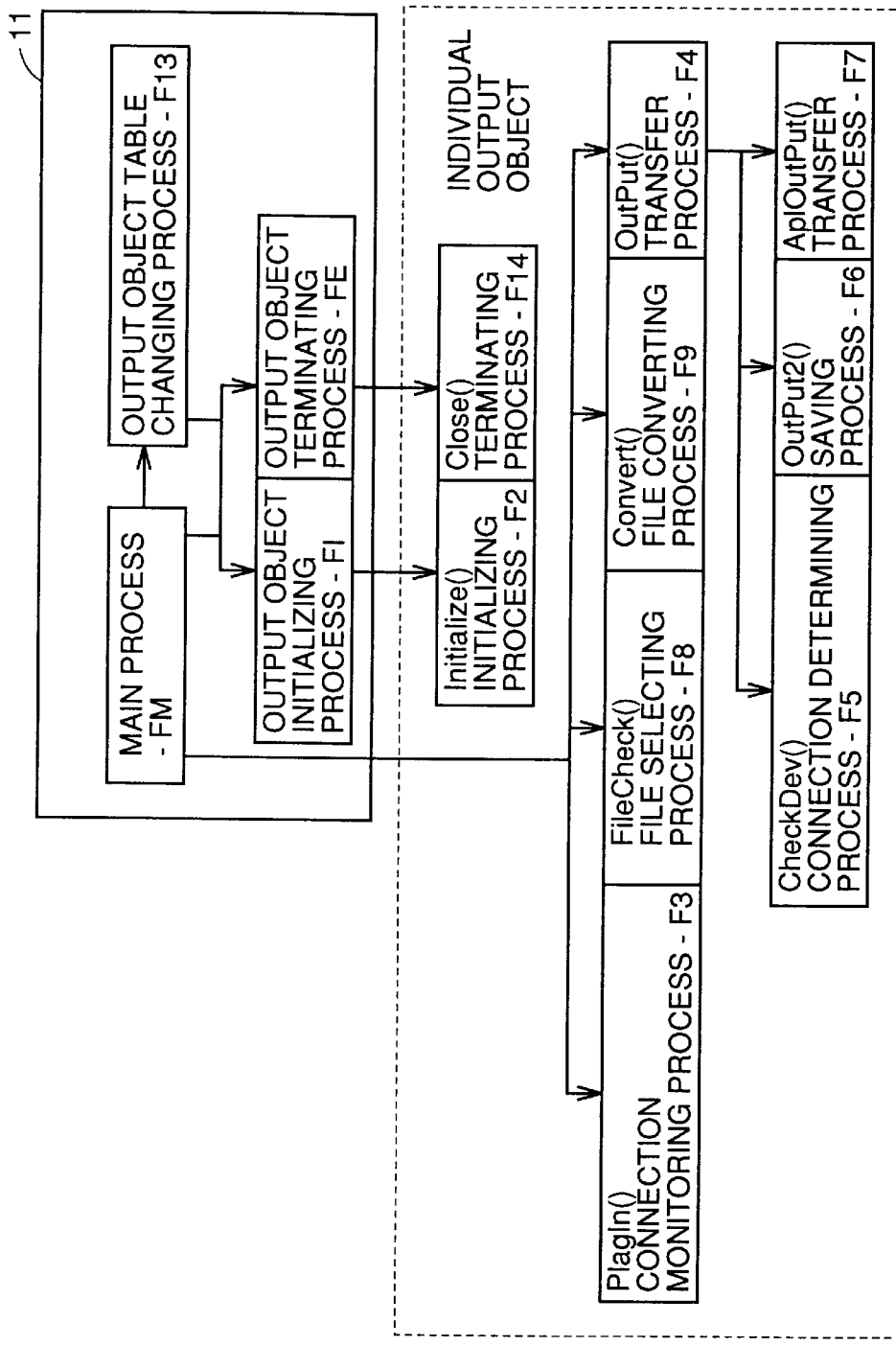
FIG. 13 shows a function calling relation when an accessed file is to be transferred and processed by a processing device group 4 in accordance with an embodiment of the present invention.

FIG. 12 schematically shows the flow of a series of processings when an accessed file FL is to be stored in a corresponding device of storage device group 5. FIG. 13 schematically shows the flow of a series of processings when an accessed file FL is transferred to be processed by a corresponding device in the processing device group 4.

The flow of the series of processings mentioned above will be described with reference to various process flows, as well as FIGS. 12 and 13.

Figure 14:
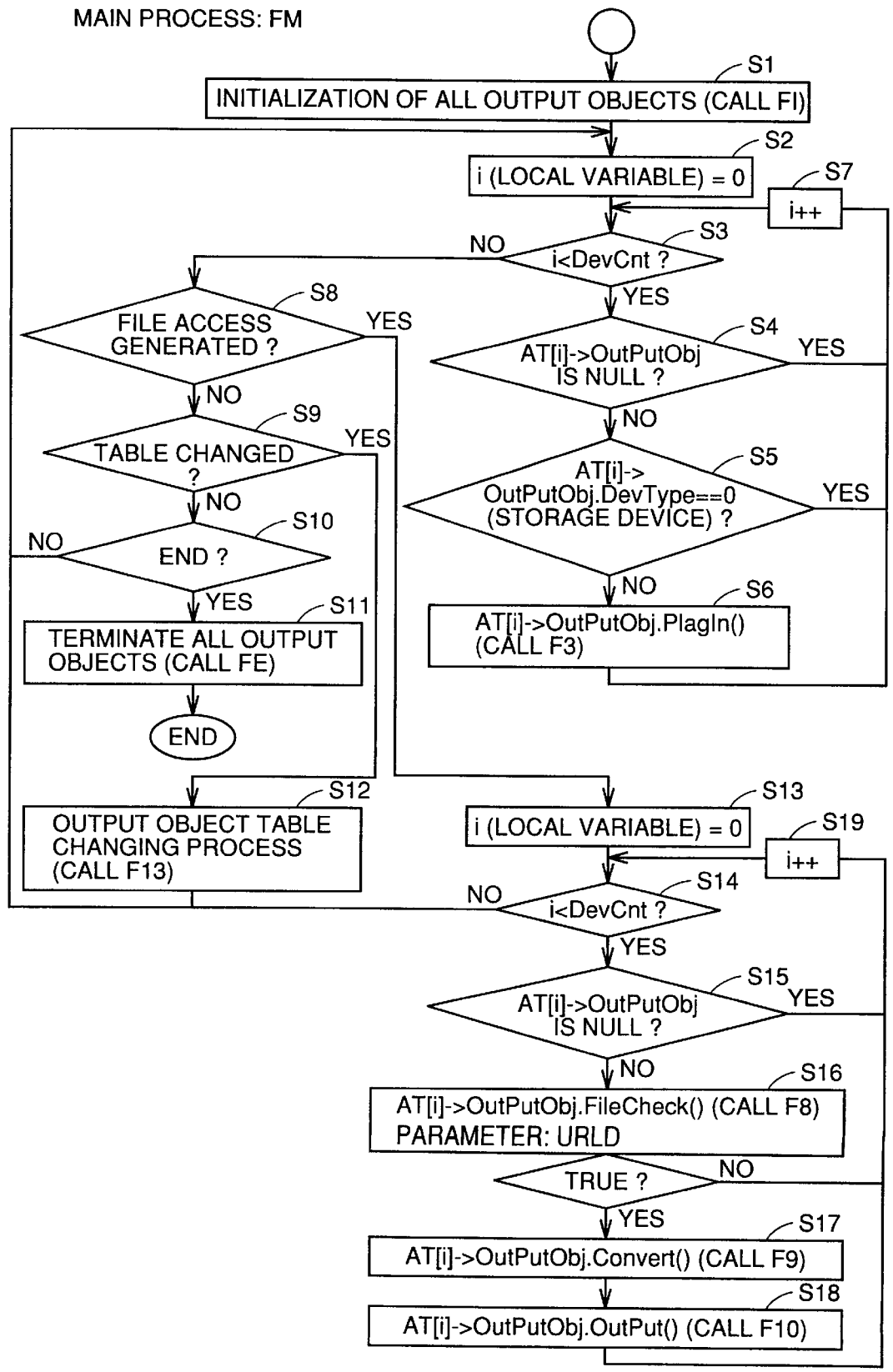
FIG. 14 is a flow chart of a main process FM by an access file processing section 12 in accordance with an embodiment of the present invention.

FIG. 14 is a flow chart of the main process FM at the access file processing section 12 in accordance with an embodiment of the present invention. When the power of computer 1 is turned ON or the access file processing section 12 is activated by CPU2 1, the following initializing process FI for all output objects is called and executed (Step 1, hereinafter simply denoted as S1).

Figure 15:
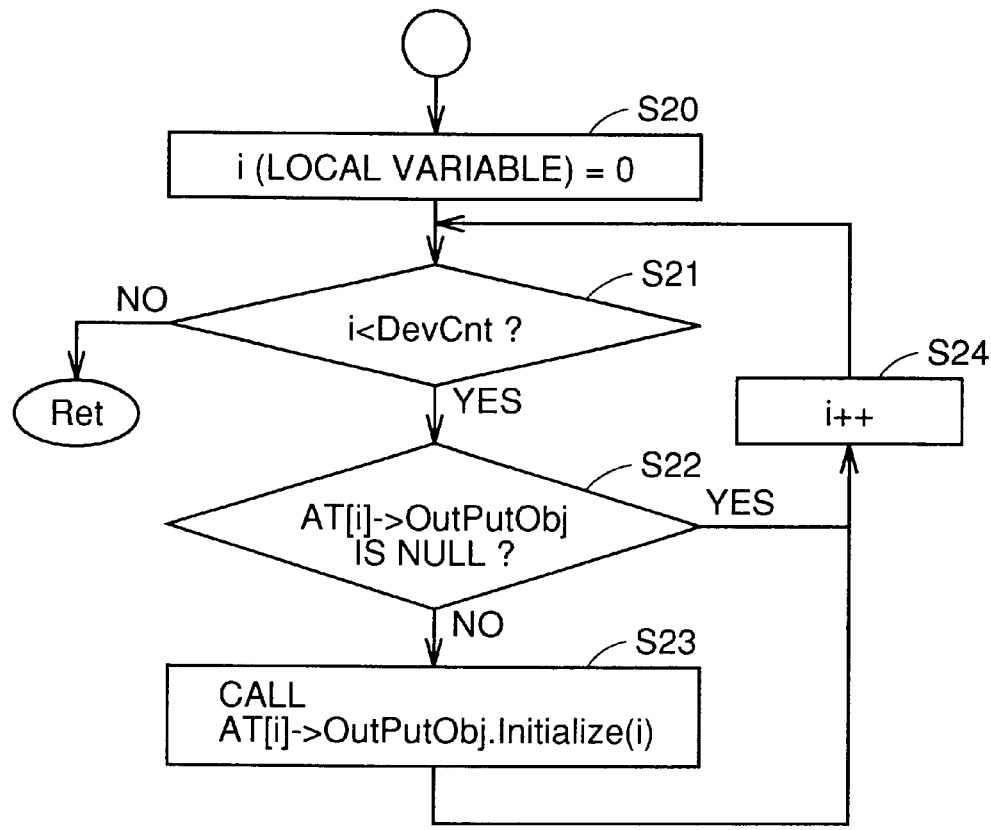
FIG. 15 is a flow chart of an all output Obj initializing process FI in accordance with an embodiment of the present invention.

FIG. 15 is a flow chart of the initializing process FI for all output objects, in accordance with the embodiment of the present invention. In the initializing process FI, the local variable i is counted up from zero by +1, and as long as i satisfies the relation i<DevCnt (=8) an output object represented by an output object name specified by Assign table AT(i) corresponding to each output device, initializing process F1 or F2 is called and executed (loop process of S20 to S24).

Figure 16:
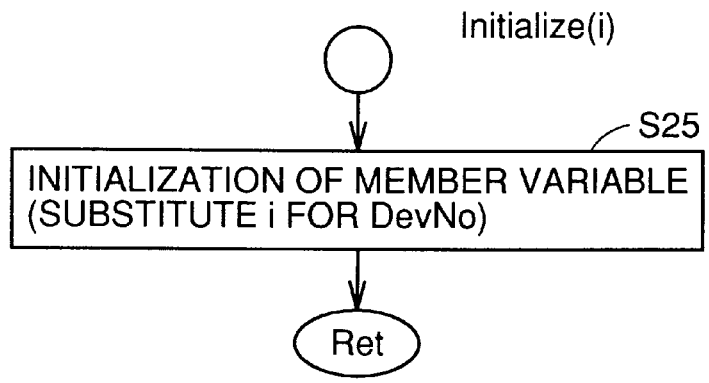
FIG. 16 is a flow chart of an output Obj initializing process F1 by a storage device in accordance with an embodiment of the present invention.

FIG. 16 is a flow chart of the initializing process F1 of an output object for a storage device in accordance with an embodiment of the present invention. When an output object of the storage device is to be initialized as shown in FIG. 16, the member variables MV of FIG. 4 related to the output object are initialized respectively (S25). At this time, the value of local variable i is set in the variable DevNo.

Figure 17:
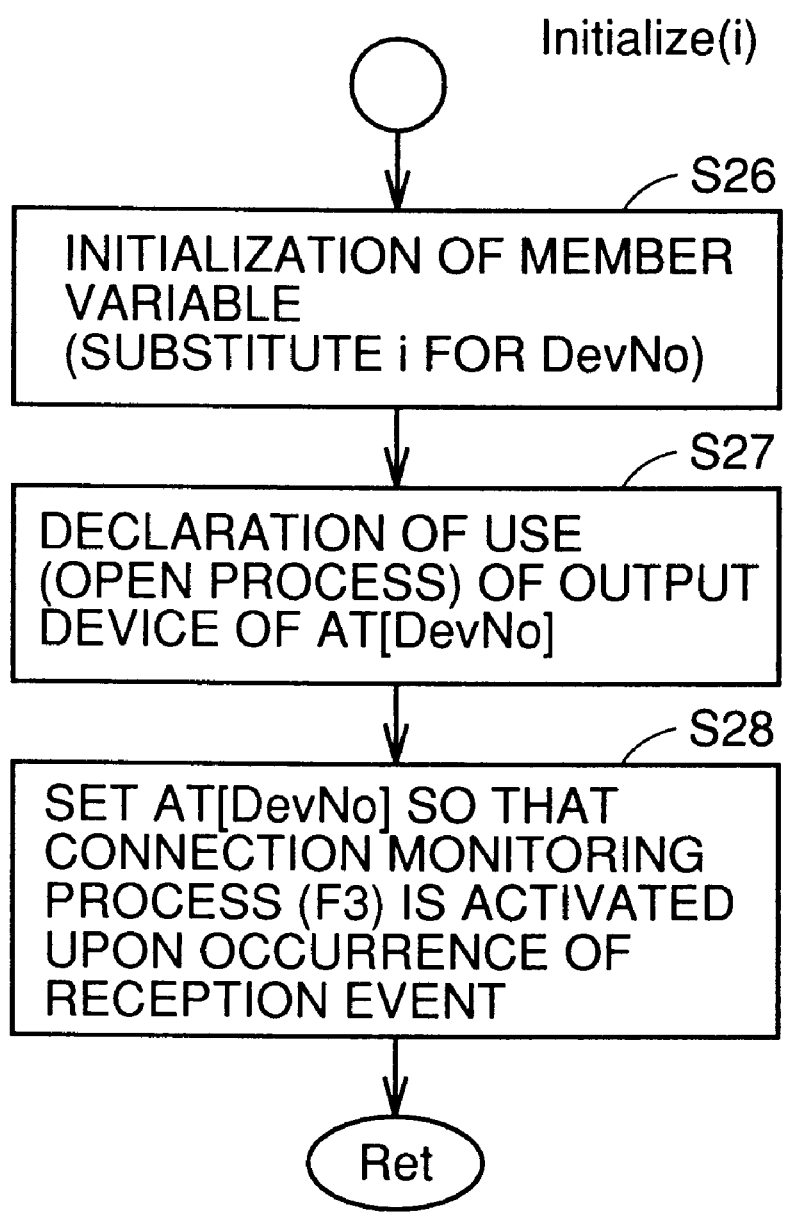
FIG. 17 is a flow chart of an output Obj initializing process F2 of a processing device in accordance with an embodiment of the present invention.

FIG. 17 is a flow chart of the initializing process F2 of an output object for a processing device in accordance with an embodiment of the present invention. When an output object for the processing device is to be initialized, the member variables Mv of the output object are initialized respectively (S26). At this time, the value of local variable i is set in the member variable DevNo of the corresponding output object is set.

Then declaration of use of the corresponding output device (open processing) is made for Assign table AT (DevNo) (S27). In order that the connection monitoring process F3, which will be described later, is activated when a reception event occurs, the output device name devname is set in the corresponding Assign table AT(DevNo) (S28).

Returning to the main process FM of FIG. 14, when initialization process FI (S1) of all output objects is complete, connection monitoring process F3 is called and executed for each of the devices to which output objects are assigned among processing device group 4 (S2 to S7).

Figure 18:
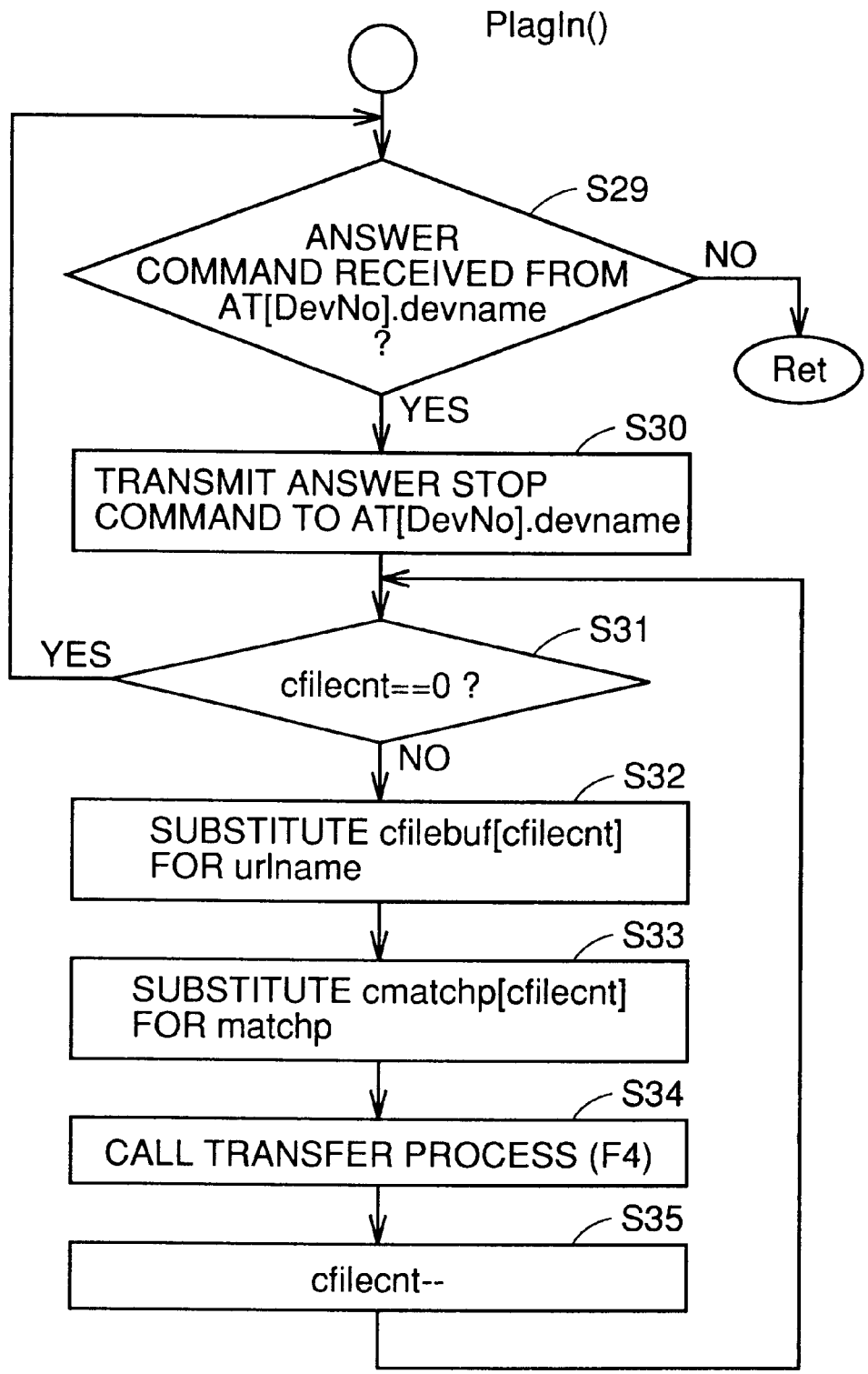
FIG. 18 is a flow chart of a connection monitoring process F3 in accordance with an embodiment of the present invention.

FIG. 18 is the flow chart of the connection monitoring process F3 in accordance with an embodiment of the present invention. In connection monitoring process F3, it is monitored at arbitrary time points whether an answer command indicating connection to computer 1 is received from each device among the processing device group 4 (S29). When the answer command is received, an answer stop command is transmitted to the corresponding processing device, and a command for stopping transmission process of the answer command is applied to the corresponding processing device (S30).

When the file FL is saved in a prescribed storage area (NO in S31), global variable uriname and the variable matchp are initialized based on global variable cfilebuf [ ] and cmatchp [ ] (S32, S33), and the transfer process F4 is called and executed for each of the saved files FL (loop process of S31 to S35).

Figure 19:
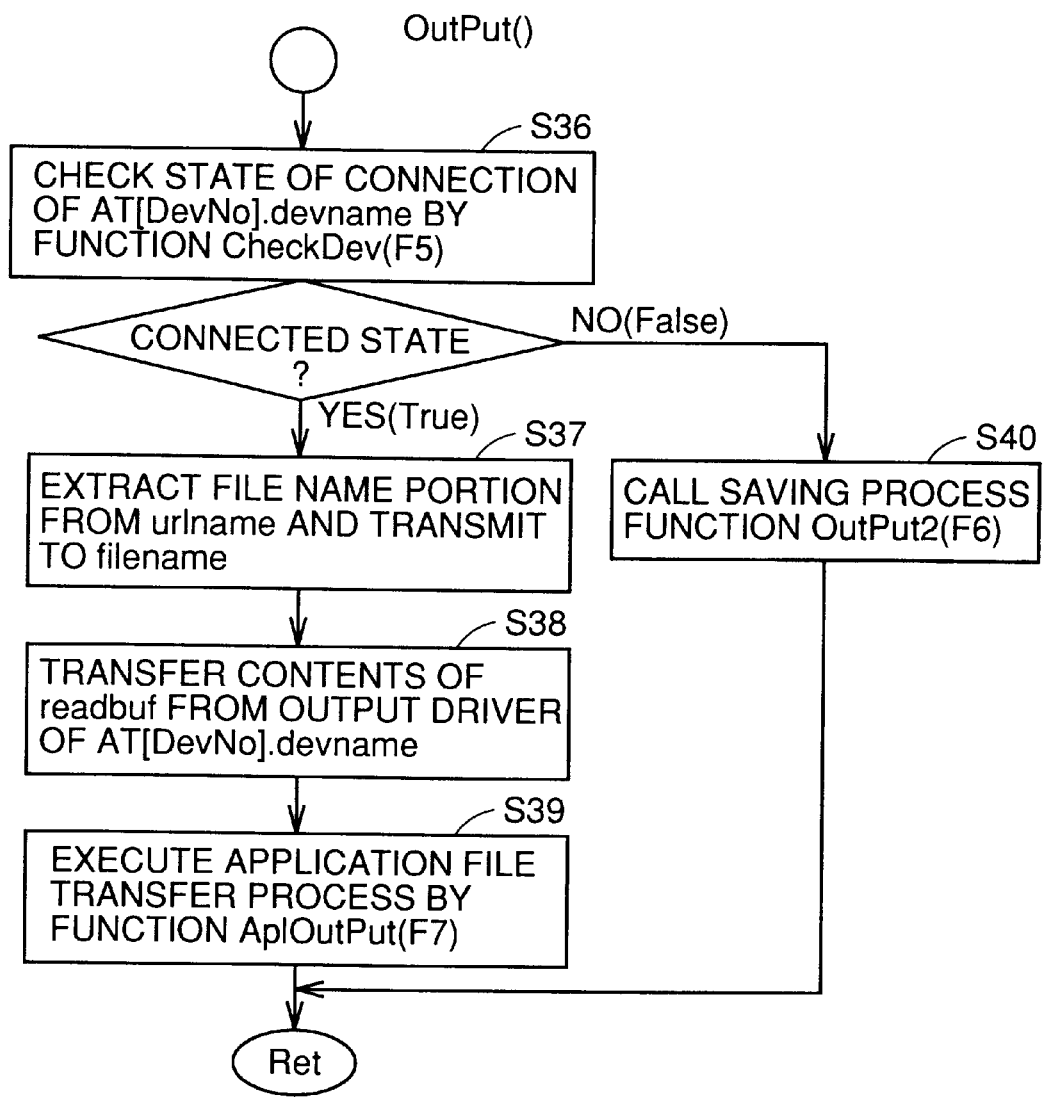
FIG. 19 is a flow chart of a process F4 for transferring file FL to a processing device in accordance with an embodiment of the present invention.

FIG. 19 shows a flow chart of the process F4 for transferring the file FL to the processing device in accordance with an embodiment of the present invention. In the transfer process F4, first, a connection determining process F5 is called and activated (S36).

Figure 20:
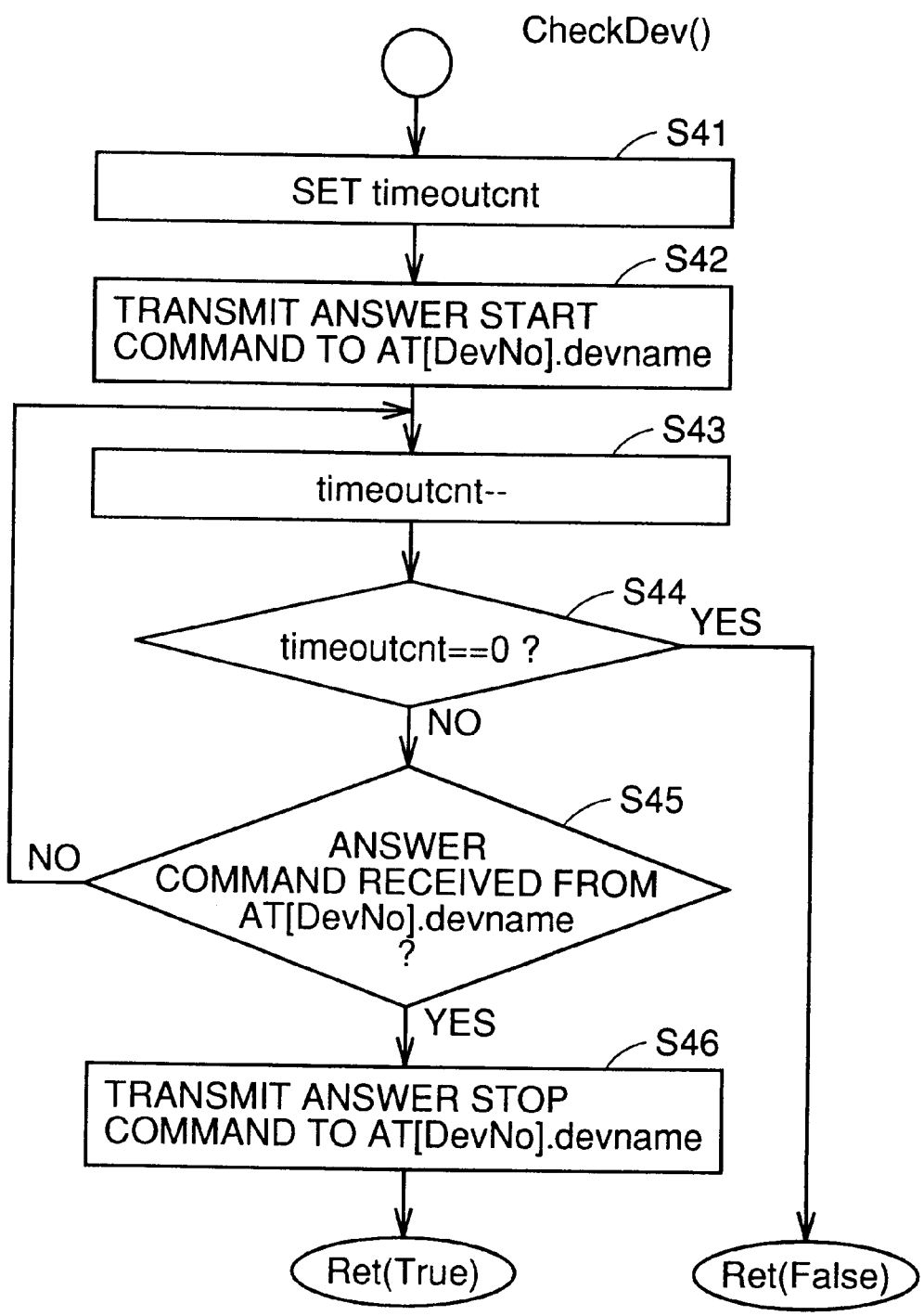
FIG. 20 is a flow chart of a connection determining process F5 determining whether a processing device is connected to computer 1 or not, in accordance with an embodiment of the present invention.

FIG. 20 shows the flow chart of the connection determining process F5 for determining whether the processing device is connected to computer 1 or not in accordance with the embodiment of the present invention. In the connection determining process F5, a local variable timeoutcount for counting a prescribed wait period to receive an answer command from each processing device is initialized (S41), and it is determined whether the answer command is received from the processing device in the prescribed period represented by the variable timeoutcount (loop process of S43 to S45).

If the command is received (YES in S45), "True" is set in Return value and the flow returns to the transfer process F4 and if not (YES in S44), "False" is set in the Return value, and the flow returns to the process F4. Therefore, in the transfer process F4, when the Return value is "True", it is determined that the corresponding processing device is connected to computer 1, and if it is "False", it is determined that the device is not connected.

Returning to the transfer process F4 of FIG. 19, when the Return value from the above described connection determining process F5 is "False", the saving process F6 is called and activated (S40) in order to temporarily save and store a file FL to be connected to the corresponding processing device among the files accessed until the processing device is connected to computer 1, in a storage device corresponding to an output device C which is a storage area for saving the file FL, for example.

Figure 21:
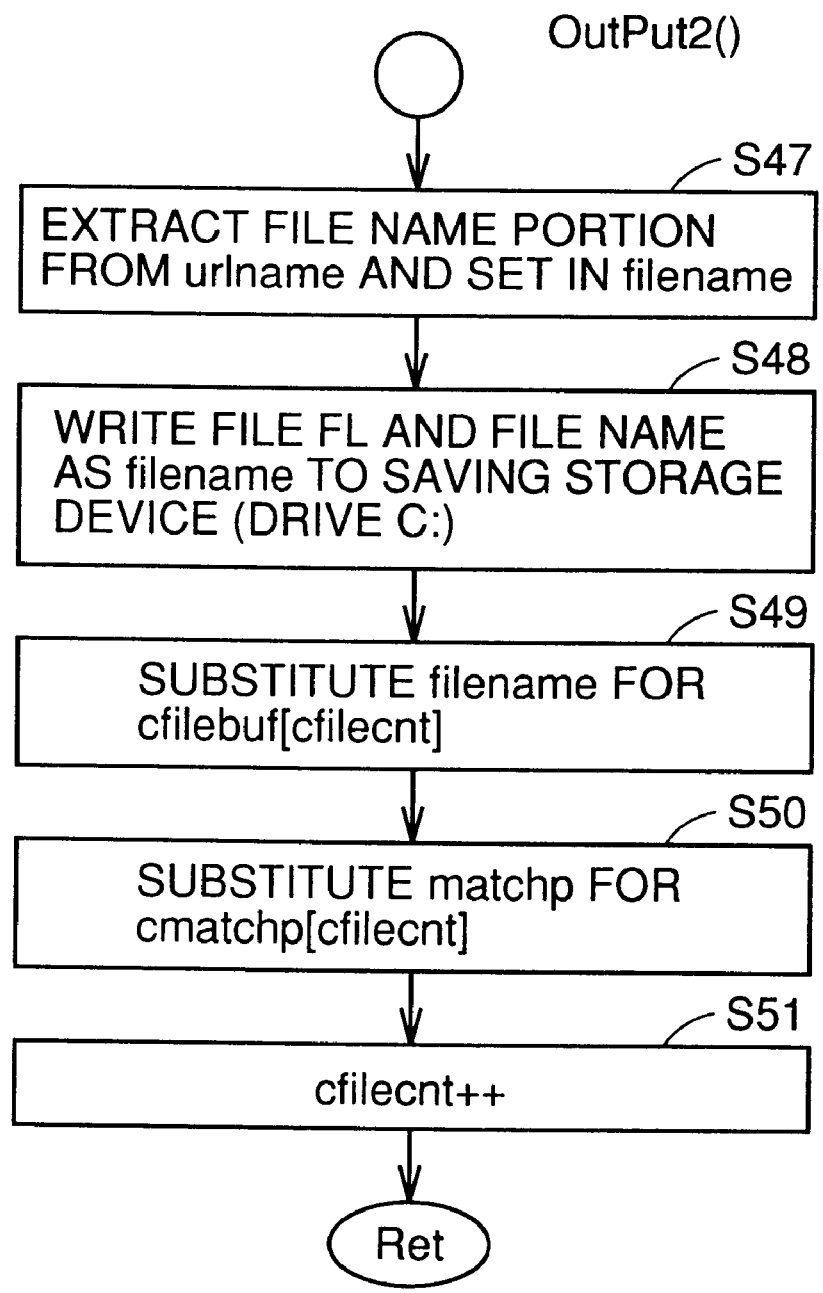
FIG. 21 is a flow chart of a saving process F6 in accordance with an embodiment of the present invention.

FIG. 21 shows the flow chart of saving process F6 in accordance with an embodiment of the present invention. In the saving process F6, from the URL data URLD of the file set in the variable uriname, the file name is extracted and set in the variable Filename (S47) and the file FL and the contents of the variable filename representing the file name are written to the storage device corresponding to output device C (S48).

Then, the contents of the variable filename is substituted in variable cfilebuf[cfilecnt], and the variable matchp is substituted in the variable cmatchp[cfilecnt] (S49, S50). Then the flow returns to transfer process F4.

In the transfer process F4 of FIG. 19, if it is determined that the corresponding processing device is connected to computer 1 (Return value="True") in the above described connection determining process F5, the file name of the file FL is extracted from URL data URLD set in the variable uriname, and the contents of the variable Readbuf, that is, the contents of file FL are transmitted to the corresponding processing device through the output driver indicated by Assign table AT(i) (S38).

Thereafter, the related application transfer process F7 is called and activated, and the related application module 120 corresponding to the transferred file FL is transferred (S39).

Figure 22:
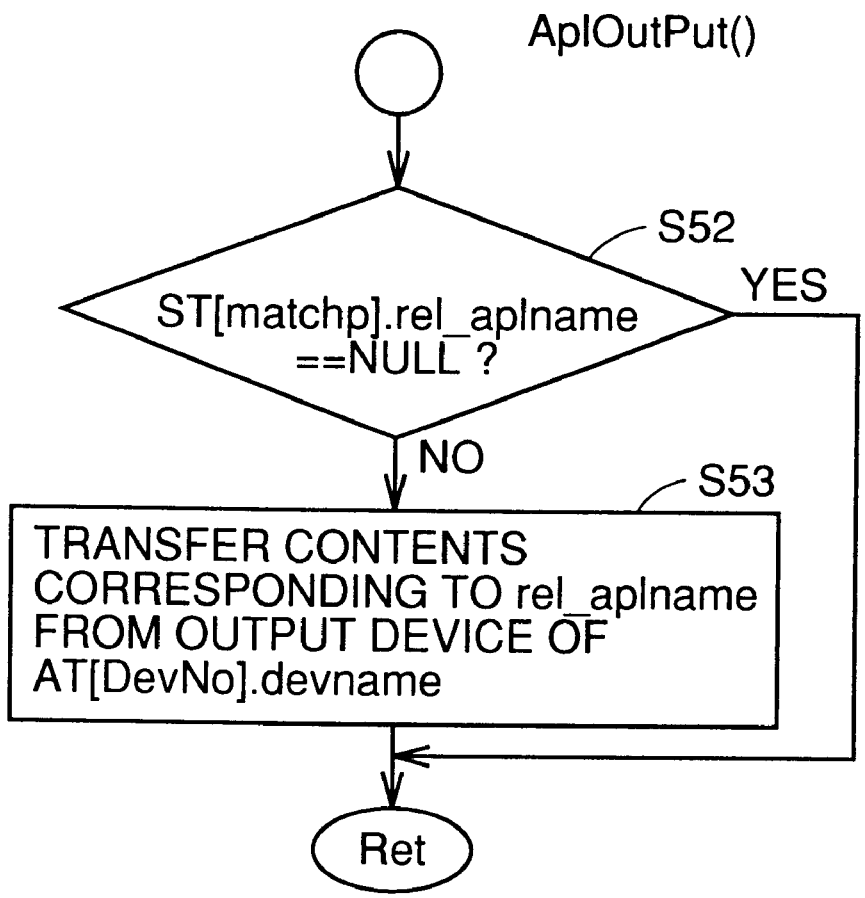
FIG. 22 is a flow chart of a related application transfer process F7 to a processing device in accordance with an embodiment of the present invention.

FIG. 22 is a flow chart of the process F7 for transferring the related application to the processing device in accordance with an embodiment of the present invention. In the related application transfer process F7, when a related application name rel_aplname corresponding to the extension extname of the file FL is specified in the file selection table STi corresponding to the output device of the destination of transfer of the file FL (NO in S52), the related application module 120 in the external storage section 26 corresponding to the specified related application name rel_aplname is transferred to that processing device to which the file FL has been transferred (S53). Thereafter, the flow proceeds to the transfer process F4 and the connection monitoring process F3, and then returns to main process FM.

As described above, when the power of computer 1 is turned ON and the main process FM is called and activated, first, of the files FL accessed by that time, one which has been saved in the storage device of output device C, for example, is automatically transferred, if a processing device requesting the file is connected based on the data type represented by the extension of the file name, to that processing device (loop process of S3 to S7 of the main process FM).

In the main process FM of FIG. 14, after activation, when a file access occurs in server 2 or in computer 1 in response to an access request AR (YES in S8), output object is assigned in Assign table AT(i) while the variable i is incremented by +1 from 0 (S13, S19) and the following process related to the transfer of file FL to the processing device or the storage device corresponding to the output device is performed (loop process of S14 to S19).

For each processing device or the storage device corresponding to the output device to which output object is assigned in Assign table AT(i), the file selection process F8 is called and activated (NO in S15, S16).

Figure 23:
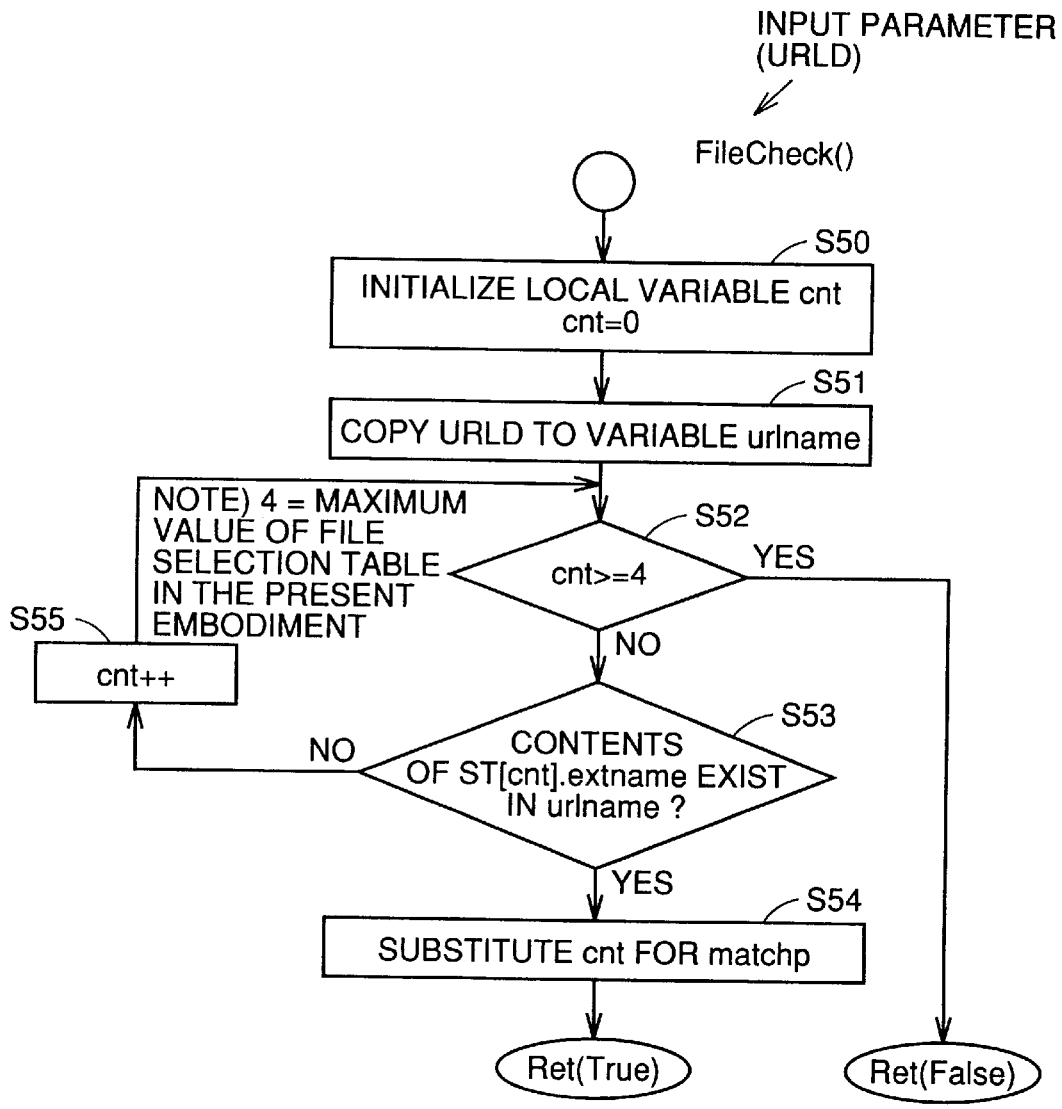
FIG. 23 is a flow chart of a file selecting process F8 in accordance with an embodiment of the present invention.

FIG. 23 is a flow chart of the file selecting process F8 in accordance with an embodiment of the present invention. In the file selecting process F8, the URL data URLD of the accessed file is input as a parameter. If the extension extname in respective file selection table STi of the processing device or the storage device corresponding to the output device to which the output object is assigned is included in the input URL data URLD, that is, when the extension is included in the file name of the file FL, the position in the file selection table STi of the extension extname is set in the variable matchp (S52 to S54).

At this time, if the extension extname of file selection table STi is included in the URL data URLD of the file FL, "True" is set in the Return value, and otherwise "False" is set, and the flow returns to the main process FM.

In the main process FM of FIG. 14, when the Return value from the file selecting process F8 described above is "False", similar process is performed on the processing device or the storage device corresponding to the next output device. If the Return value is "True", the file conversion process F9 is called and activated (S17).

Figure 24:
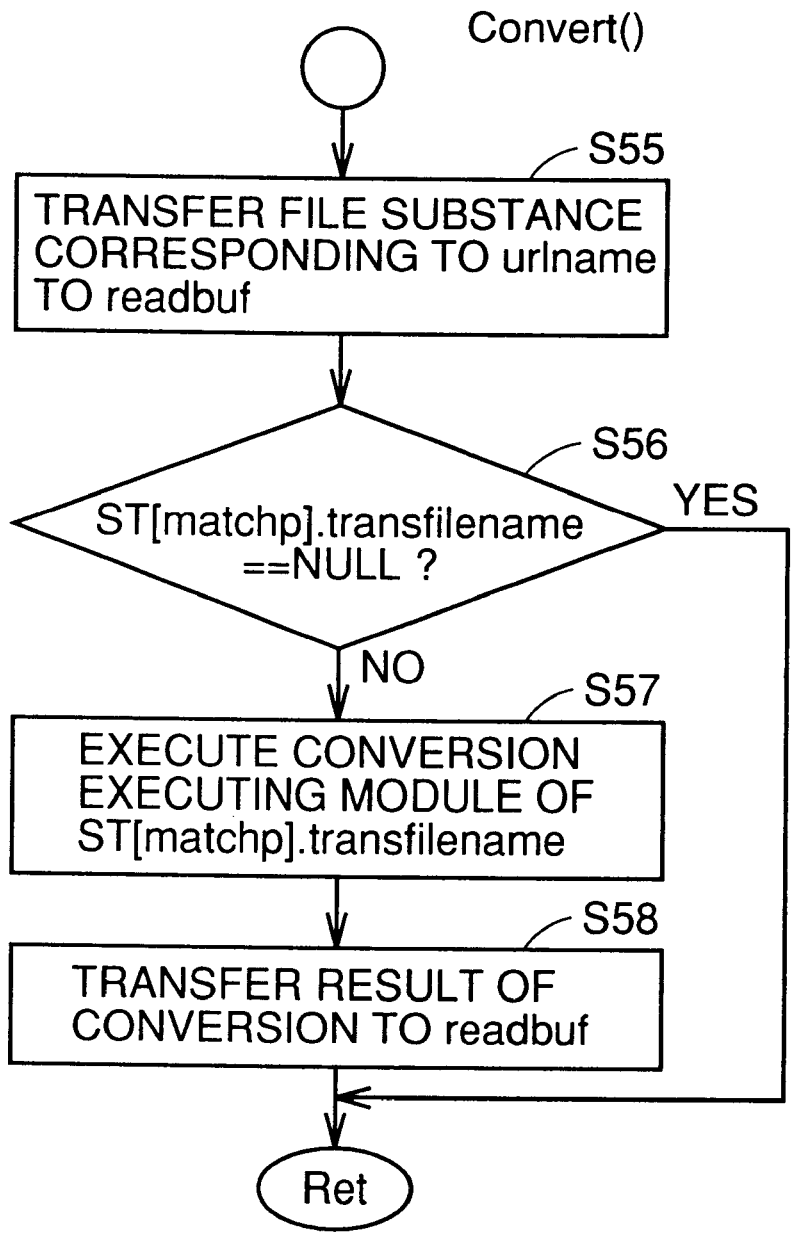
FIG. 24 is a flow chart of a file converting process F9 in accordance with an embodiment of the present invention.

FIG. 24 shows the flow chart of the file converting process F9 in accordance with an embodiment of the present invention. In the file converting process F9, based on the URL data URLD of the file FL, the substance (contents) of the file FL is transferred to the variable readbuf (S55).

Then it is determined whether a file conversion program name trans filename corresponding to the extension extname of the file selection table STi specified in the file selecting process F8 described above is specified or not (S56). If it is specified (NO in S56), the conversion executing module 130 in the external storage section 26 corresponding to the specified file conversion program name trans filename is executed, and the contents or format of the file FL in the variable readbuf is converted to prescribed contents or format (S57, S58).

The contents of the file FL converted or not converted by the file converting process F9 are applied to main process FM using the variable readbuf.

In the main process FM, in accordance with the contents of the output object table OTi corresponding to the output object which is being executed, any of duplicating process (normal) F10, duplicating process (with format) F11 and transfer process F4 is called and activated (S18). Description of transfer process F4 is not repeated.

Figure 25:
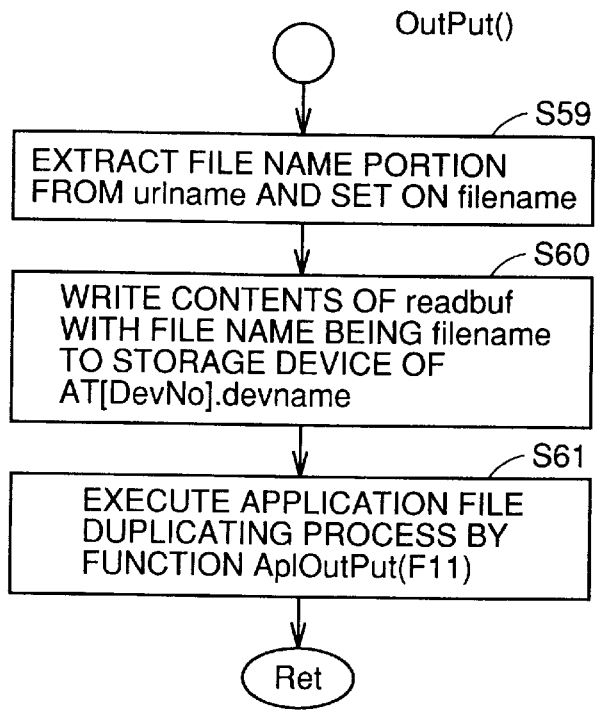
FIG. 25 is a flow chart of a duplicating process (normal) F10 in accordance with an embodiment of the present invention.

FIG. 25 is the flow chart of the duplicating process (normal) F10 in accordance with an embodiment of the present invention. In the duplicating process (normal) F10, the file name of the file FL is extracted from the variable uriname and set in the variable filename (S59). The contents of the variable readbuf are with the set contents of the variable filename being the file name, in the storage device corresponding to the output device which is designated by the Assign table AT(i), and an application module 120 related to the file FL is written in accordance with the related application duplicating process F11 (S60, S61). Here, the storage device is the storage device among storage device group 5 to which output objects corresponding to output object tables OT0, OT2 and OT3 shown in FIGS. 9A, 10A and 10B are assigned.

Figure 26:
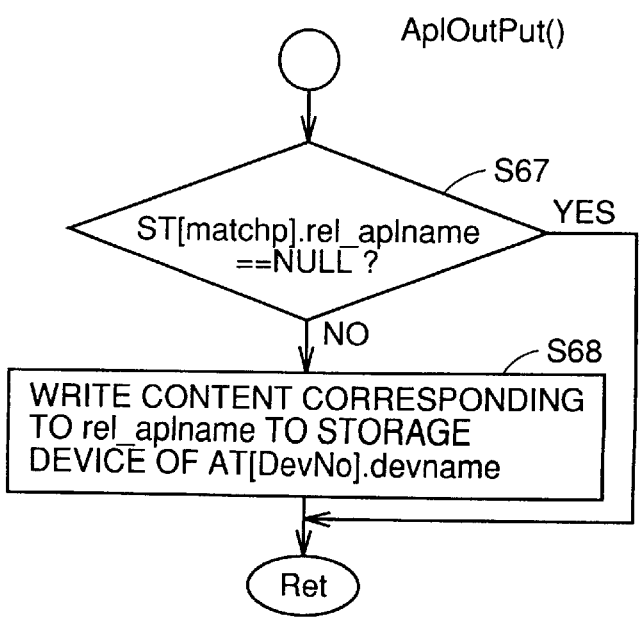
FIG. 26 is a flow chart of a related application duplicating process F11 to a storage device in accordance with an embodiment of the present invention.

FIG. 26 is the flow chart of the related application duplicating process F11 to a storage device, in accordance with an embodiment of the present invention. In the related application duplicating process F11, first, if there is a related application name rel_aplname corresponding to the extension extname of the file FL in the file selection table STi, the contents thereof, that is the related application module 120 designated thereby is written to the storage device corresponding to the output device designated by the Assign table AT(i) (S67, S68).

Figure 27:
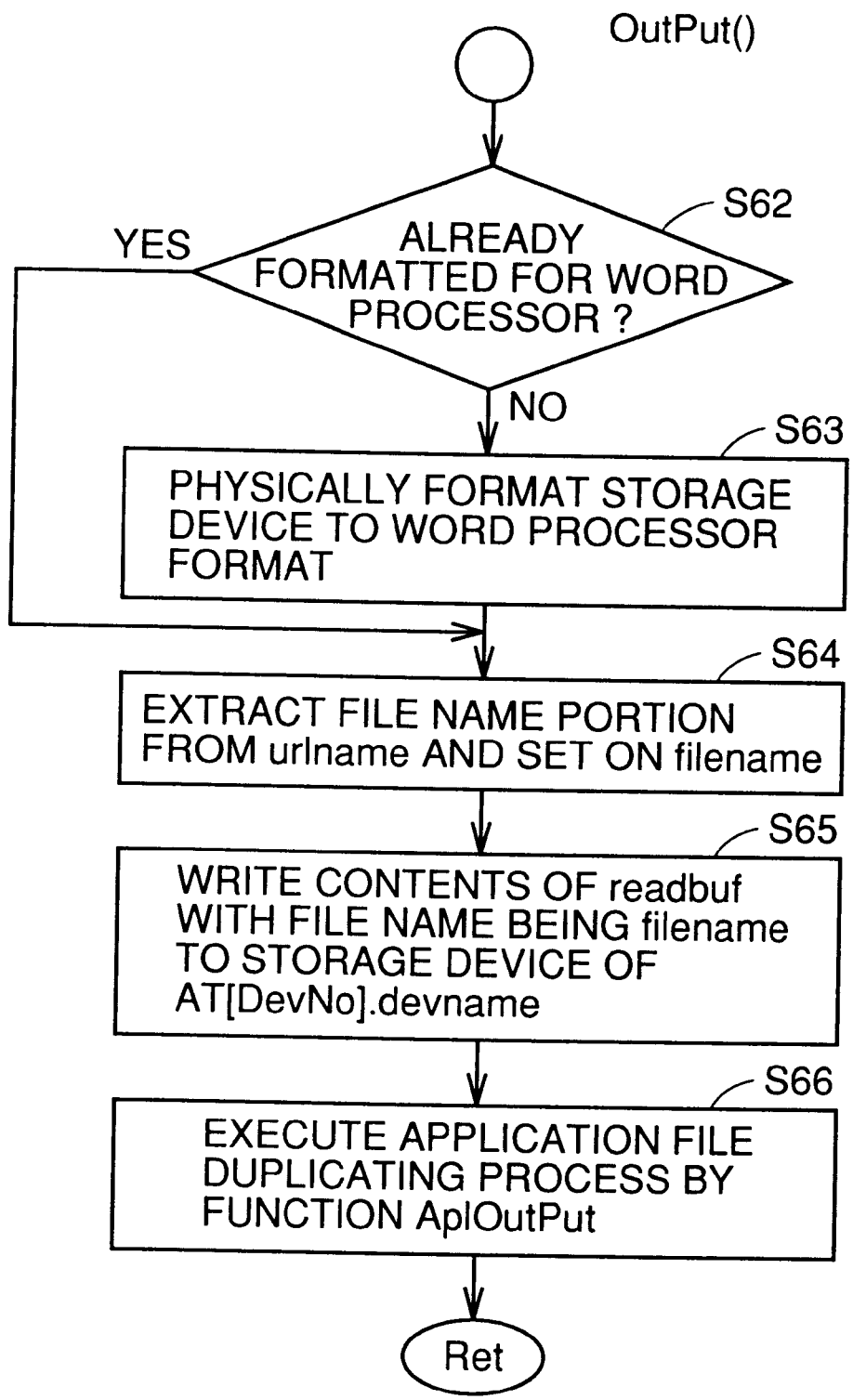
FIG. 27 is a flow chart of a duplicating process (with format) F12 in accordance with an embodiment of the present invention.

FIG. 27 shows the flow chart of the duplicating process (with format) F12 in accordance with an embodiment of the present invention. In the duplicating process (with format) F12, physical formatting process of the storage device is performed. When the file FL is written to an FD and the FD is accessed by a word processor, for example, the format of the FD is physically formatted so as to be matching the format of the word processor, allowing access by the word processor (S62, S63).

Thereafter, in the similar manner as the duplicating process (normal) F10, the file name of the contents of the file FL and the corresponding related application module 120, if any, are written to the storage device corresponding to the output object which is being executed at present (S64 to S66).

The duplicating process (with format) F12 is called and activated when the file FL is to be stored in the storage device corresponding to the output object defined by the output object table OT1 shown in FIG. 9B.

As described above, when the delivery of the accessed FL or the file temporarily saved in the storage device corresponding to the output device C for duplication or transfer process is complete for every storage device or processing device to which the output object has been assigned on Assign table AT(i) (NO in S3 and NO in S14), whether there is a request for changing the set contents of the output object table OTi is determined. If there is a request for change, the output object table changing process F13 is called and activated (S12).

Figure 28:
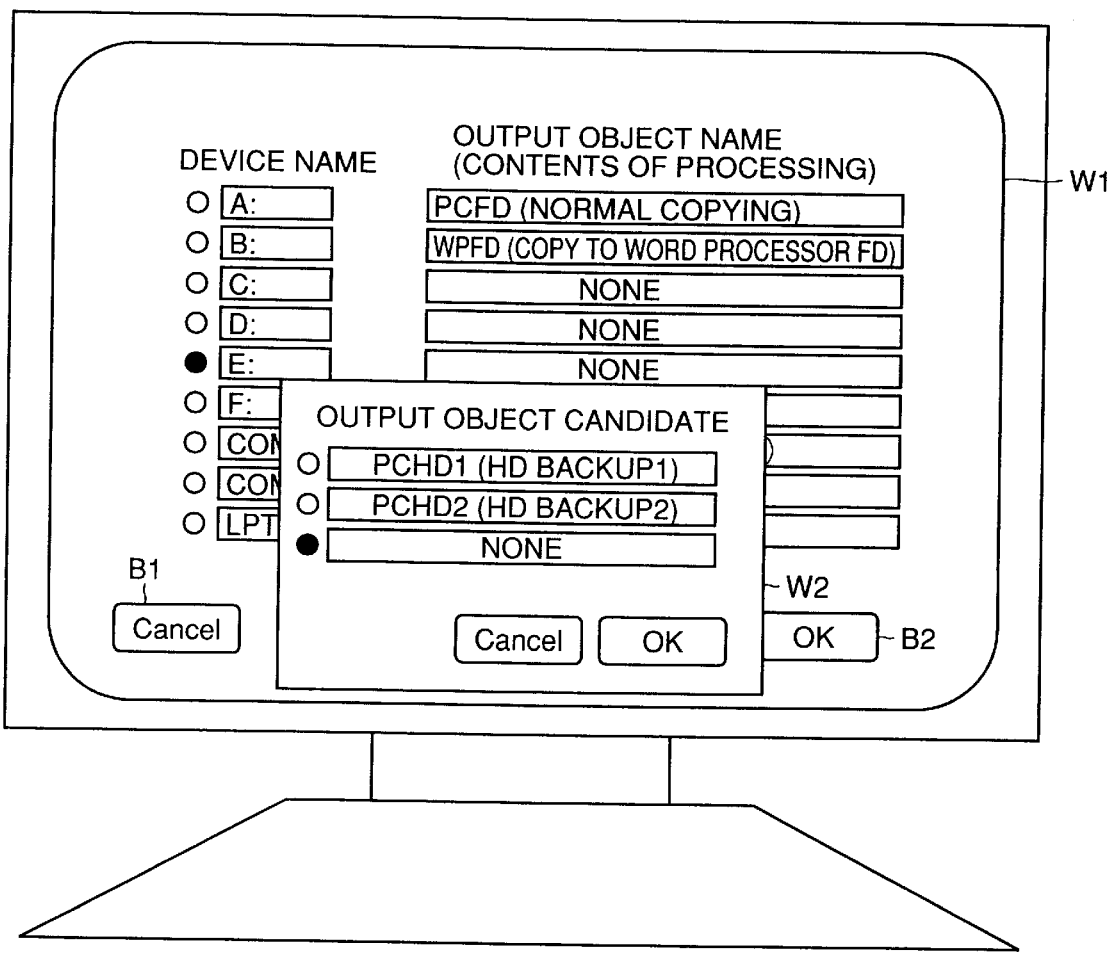
FIG. 28 shows an example of a display image when the output Obj table is changed in accordance with an embodiment of the present invention.
Figure 29:
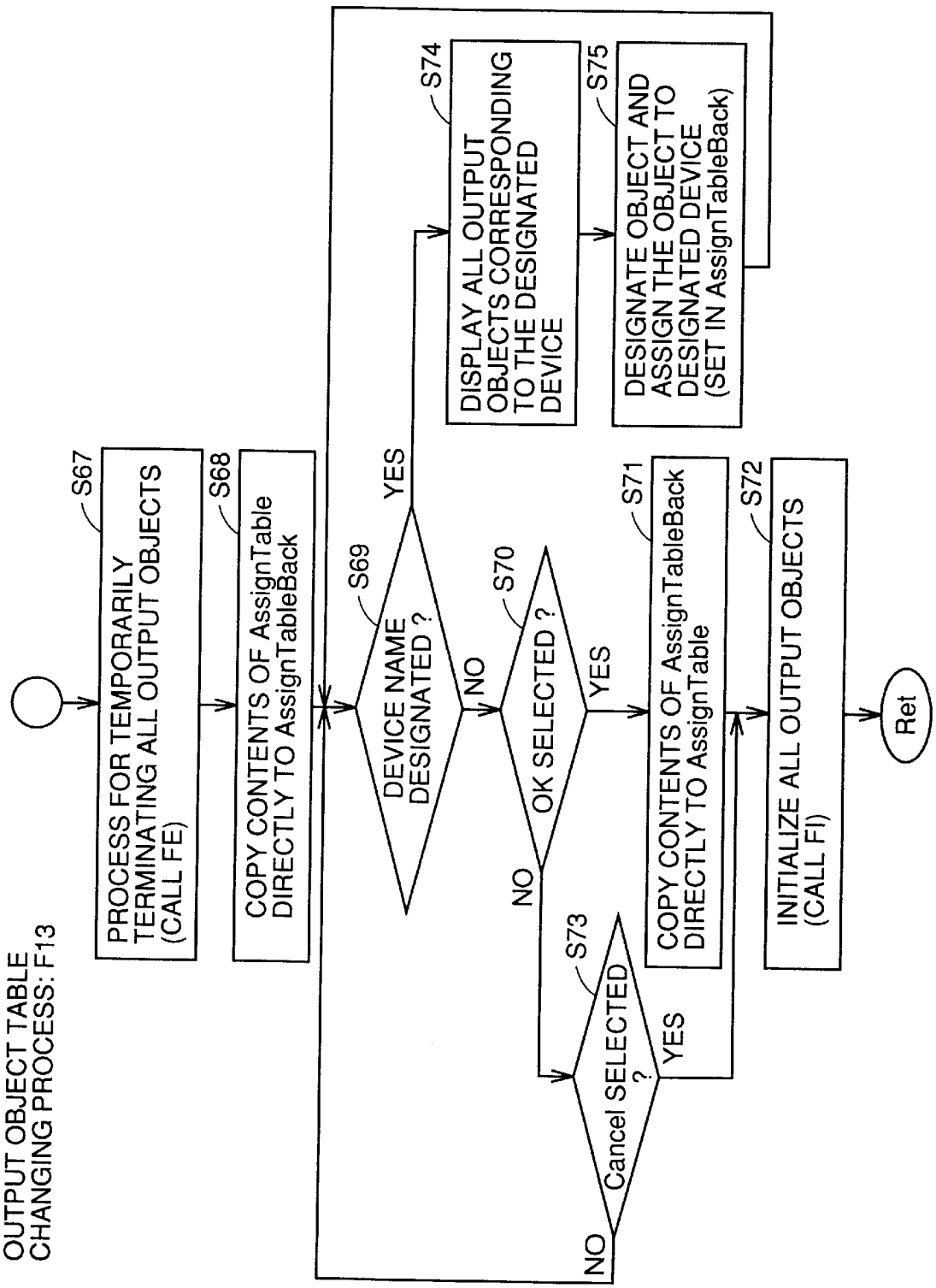
FIG. 29 is a flow chart of an output Obj table changing process F13 in accordance with an embodiment of the present invention.
Figure 30:
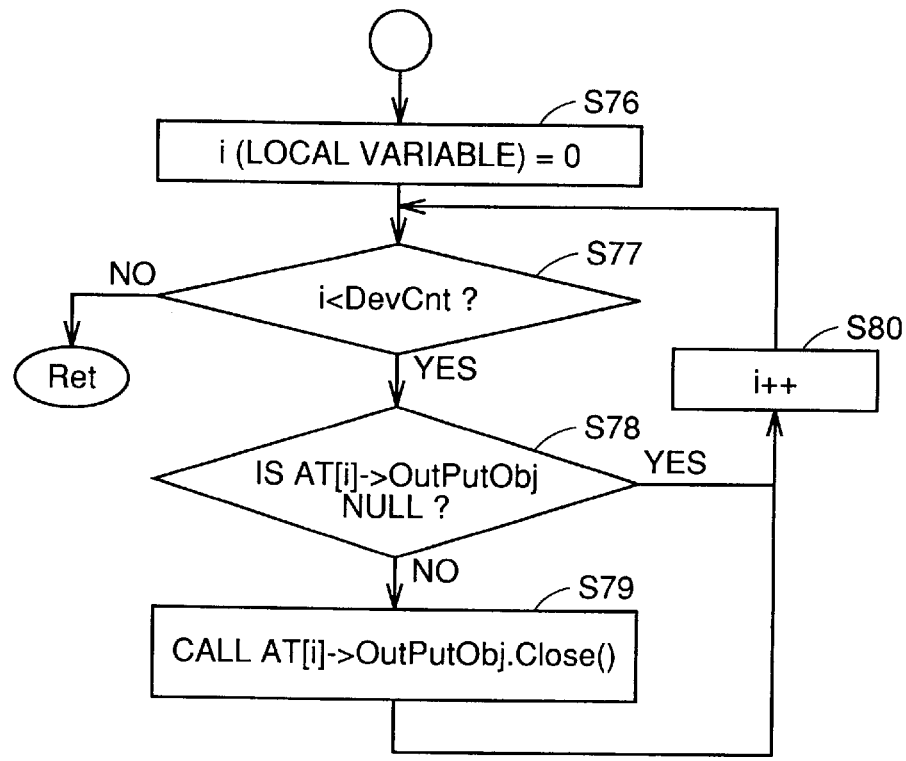
FIG. 30 is a flow chart of a terminating process FE of all output Obj in accordance with an embodiment of the present invention.
Figure 31:
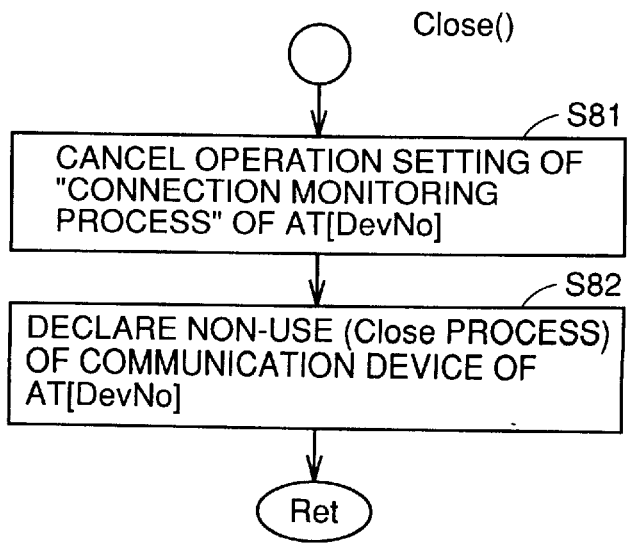
FIG. 31 is a flow chart of a terminating process F14 of an output Obj by a processing device in accordance with an embodiment of the present invention.

FIG. 28 shows an example of the display screen when the output object table is changed in accordance with an embodiment of the present invention. FIG. 29 shows a flow chart of the output object table changing process F13 in accordance with an embodiment of the present invention. FIG. 30 shows the flow chart of the terminating process FE for all output objects in accordance with an embodiment of the present invention. FIG. 31 shows the flow chart of a terminating process F14 of an output object of the processing device in accordance with an embodiment of the present invention.

When a request for changing the set contents of the output object table OTi is externally input by a user through input section 22, main process FM calls and activates the output object table changing process F13 in response to the input of the request.

In the output object table changing process F13, first the terminating process FE for all the output objects is called and activated (S67). In the all output objects terminating process FE shown in FIG. 30, a process in accordance with the function close ( ) is performed on every one of the output objects assigned in the Assign table AT(i), which function is defined by the corresponding output object table OTi (loop process of S77 to S80). More specifically, for the output object corresponding to each device of the storage device group 5, return process only is performed, and for the output object corresponding to each device in the processing device group 4, the output object terminating process F14 is called and executed.

In the output object terminating process F14 of the processing device shown in FIG. 31, activation setting of the connection monitoring process F3 defined by the output object assigned to an output device of the processing device in Assign table AT(i) is cancelled, and a declaration of non use of the output device (close process) is performed (S81, S82).

In the output object table changing process F13 shown in FIG. 29, when the terminating process is complete for all the output objects in the above described manner (S67), the contents of the Assign table AT(i) are copied directly to a variable AssignTableBack (S68).

At this time, only the window W1 of FIG. 28 is displayed on display section 23. Window W1 displays the contents of the variable AssignTableBack. Viewing the display, the user, wishing to change assignment of the output object corresponding to the output device E, for example, designates the output device name E as the device name (YES in S69), and names of all the output objects which can be assigned to the designated output device name E are displayed on a window W2 (S74). The user selects the output object name to be assigned to output device E from the contents displayed on window W2 and designates the name through input section 22, so that the designated output object name is written as the assigned output object name OutPutObj corresponding to the output device name E in the variable AssignTableBack (S75).

When the output device name displayed on window W1 is not designated and an OK button B2 is pressed (NO in S69 and YES in S70), assignment of the output object table is not changed. Therefore, the contents of the variable AssignTableBack is copied directly to the Assign table AT(i) and the initializing process FI for all output objects described above is called and activated (S71 and S72).

When the output device name displayed on window W1 is not designated, and neither OK button B2 nor Cancel button B 1 is pressed (NO in S69, NO in S70 and NO in S73), the control again waits for the designation input of the output device name by the user (S69).

If the Cancel button B1 is pressed (YES in S73), the contents of AssignTableBack are discarded, and based on the contents of Assign table AT(i), the initializing process FI of all output objects is called and activated (S72).

By the process F13 for changing the output object table shown in FIG. 29, it is possible to arbitrary change the output object to be assigned to a desired output device, in accordance with the state of connection of each device in the processing device group 4 or the storage device group 5 of the computer 1, by the user.

In the main process FM shown in FIG. 14, when the process F13 for changing the output object table described above is not desired but the terminating process is desired, the all output object terminating process FE described above is called and activated.

Figure 32:
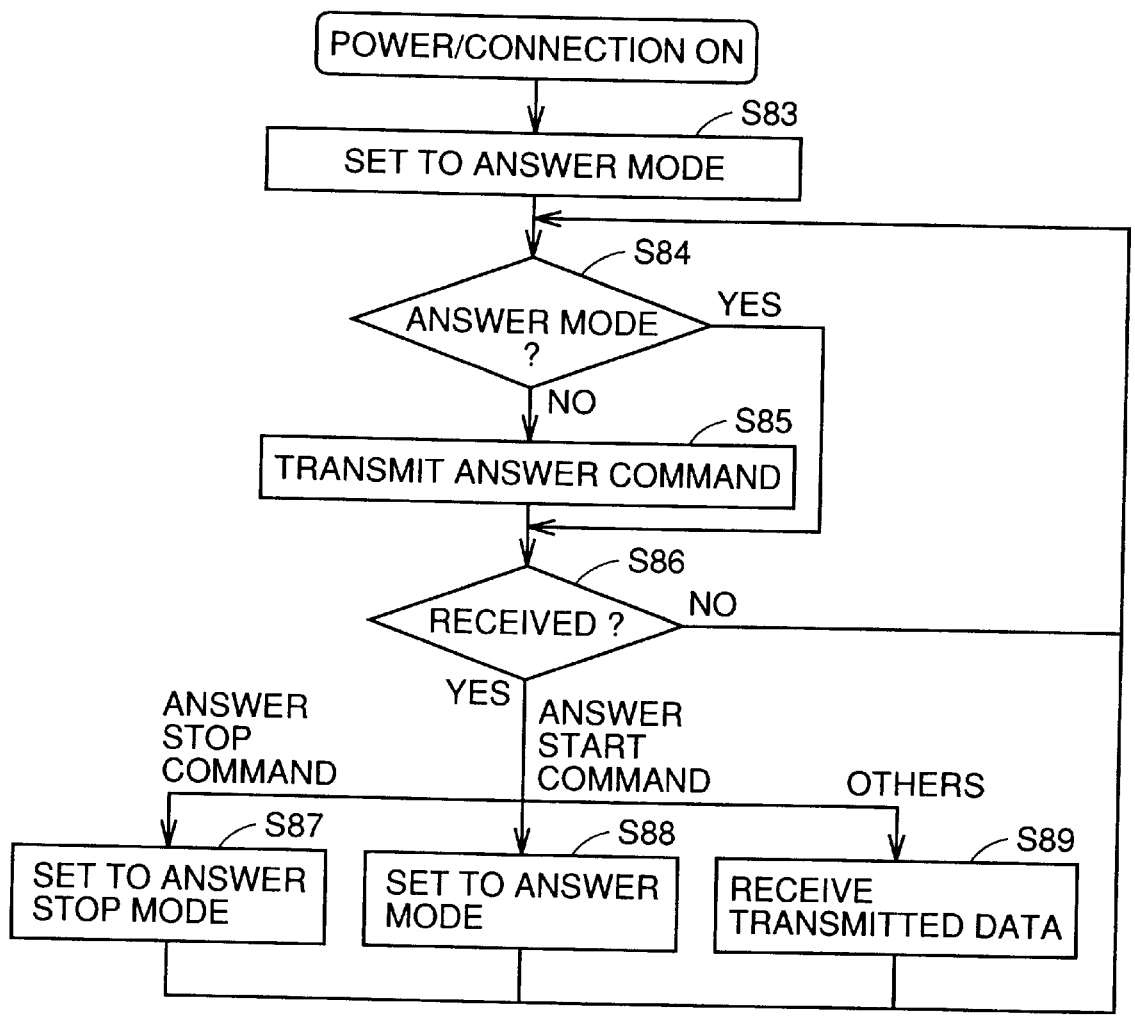
FIG. 32 is a flow chart of a communication process F15 on the side of a processing device in accordance with an embodiment of the present invention.

FIG. 32 shows the flow chart of communication process F15 on the side of the processing device in accordance with an embodiment of the present invention. In each device of the processing device group 4 connected to computer 1, at the time of power ON or connection to computer 1, communication process F15 is activated for transmitting the answer command received in the connection monitoring process F3 or connection determining process F5 described above, or for receiving the answer stop command and the answer start command transmitted from the process F5 or F3.

First, the operation is set in an answer mode for transmitting the answer command (S83), and the answer command is transmitted through the corresponding output device (S85).

Thereafter, transmission of the answer command is repeated until any command is received (loop process of S84 to S86). When the answer stop command from connection monitoring process F3 is received, the operation enters a mode for stopping transmission of the answer command (S87), when an answer start command from connection determining process F5 is received, the operation enters an answer mode for transmitting the answer command (S88), and when other command is received, the operation enters a mode for receiving transmitted data (S89).

Though computer 1 has been described as an apparatus for accessing files in response to an access request AR and for selectively transferring the accessed files FL to various devices in accordance with the data types, the apparatus is not limited to computer 1. For example, the apparatus may be a TV connected to a communication line such as the internet.

In the above described embodiment, assuming that a file including time of cooking by a microwave oven in the form of data (having the extension of ".cook") is included in the files provided by server 2, and when files provided by server 2 are accessed by a private computer, the file is automatically transferred to a microwave oven connected to computer 1 in accordance with the data type indicated by the extension .cook of the file, and the microwave oven operates in accordance with the contents of the file FL. This allows application to house keeping control.

In the present embodiment, as the function of converting files is provided by the file converting process F9, handling of files having the same data type but different data format or contents which cannot be readily processed by the processing devices or storage devices connected to computer 1 is facilitated.

For example, GIF (Graphics Interchange Format) or JPEG (Joint Photographic Expects Group) file F1 as image data can be handled in computer 1, while digital camera 42 connected to computer 1 cannot process image data of the file F1 directly in that data format. Accordingly, the contents or format is converted in advance by the file converting process F9, to allow processing. Further, when a storage device in accordance with the present embodiment is used as a device dedicated for the backup of the files FL, it is possible to provide backups of those files FL corresponding to a required data type among the accessed files FL automatically.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. In an apparatus having one or more different device drivers and one or more different units connected through respective ones of said device drivers for supplying a file to one or more of said units through corresponding said device drivers, a file selection table for each of said one or more device drivers, storing a data type of a file of which delivery is requested by said unit connected to the device driver, a delivery procedure table for each of said one or more device drivers, storing procedures of delivery of the file to said unit connected to the device driver; a method of file transfer, comprising the steps of accessing, in a file access step, a file in response to an access request generated in said apparatus; and delivering, in a file delivery step, when it is determined for each of said one or more device drivers that the device driver is the one used for delivery of the file accessed in said access step, the file accessed in said accessing step to that one of said units which is connected through said device driver, wherein said file delivery step includes a device driver determining step for determining, for each of said one or more device drivers, based on data type of the file accessed in said file access step, that the device driver is the one used for delivery of the file, wherein said device driver determining step determines, for each of said one or more device drivers, when a data type of a file accessed in said file access step is stored in said file selection table, that the device driver is the one used for delivery of the file, and wherein in said delivery step, the file is delivered to said unit connected to said device driver in accordance with the contents of said delivery procedure table corresponding to that device driver determined in said device driver determining step to be the device driver used for the delivery of the file accessed in said file access step.

2. A file transfer apparatus having one or more different device drivers, and one or more different units connected through respective ones of said device drivers, for delivering a file to respective ones of said one or more units through corresponding said device drivers, comprising:

file access means for accessing a file in response to an access request generated in said apparatus;

file delivery means for delivering, when it is determined for each of said one or more device drivers that the device driver is the one used for delivery of the file accessed by said access means, the file accessed by said access means to said unit connected through the device driver, wherein said file delivery means includes device driver determining means for determining, for each of said one or more device drivers, based on data type of the file accessed by said file access means, that the device driver is the one used for delivery of the file, a file selection table for each of said one or more device drivers, storing said data type of the file of which delivery is required by said unit connected to the device driver; wherein said device driver determining means determines, for each of said one or more device drivers, when data type of the file accessed by said file access means is stored in corresponding said file selection table, that the device driver is the one used for the delivery of the file, and a delivery procedure table for each of said one or more device drivers storing procedures of delivery of the file to said unit connected to the device driver; wherein said file delivery means delivers, in accordance with the contents of said delivery procedure table corresponding to that device driver which is determined by said device driver determining means to be the one used for delivery of the file accessed by said file access means, the file to said unit connected to the device driver.

3. The file transfer apparatus according to claim 2, wherein said one or more units include one or more input/output units for inputting/outputting information or one or more storage units for storing information; and said one or more device drivers include one or more input/output device drivers for connecting said one or more input/output units to said file transfer apparatus or one or more storage device drivers for connecting said one or more storage units to said file transfer apparatus.

4. The file transfer apparatus according to claim 3, wherein said delivery procedure of said delivery procedure table corresponding to each of one or more said storage device drivers includes a duplication process procedure for duplicating said file to said storage unit connected to the storage device driver; and said delivery procedure of said delivery procedure table corresponding to each of said one or more input/output device drivers includes a transfer process procedure for transferring said file to said input/output unit connected to the input/output device driver.

5. The file transfer apparatus according to claim 4, wherein said file delivery means further includes connection determining means for determining whether said input/output unit is connected to said input/output device driver corresponding to that device driver which is determined by said device driver determining means to be the device driver used for delivery of said file, and file saving means for duplicating and saving, when the input/output unit is determined to be not connected by said connection determining means, data related to the file accessed by said file access means to said storage unit connected to said storage device driver, in accordance with said duplication processing procedure corresponding to a prescribed said storage device driver.

6. The file transfer apparatus according to claim 5, wherein the file accessed by said file access means corresponding to said data saved by said file saving means is transferred, when said input/output unit is connected to corresponding each of said one or more input/output device drivers among said one or more device drivers, to said input/output unit using corresponding said transfer processing procedure through the input/output device driver.

7. The file transfer apparatus according to claim 2, wherein said file delivery means further includes application file delivery means for delivering, when said file is delivered, an application file related to processing of the file through the device driver determined by said device driver determining means to said unit connected to the device driver, together with said file as needed.

8. The file transfer apparatus according to claim 7, wherein said file delivery means converts, when said file is delivered, contents or format of said file to prescribed contents or format in advance as needed.

9. The file transfer apparatus according to claim 2, wherein said file access means accesses a file inside or outside of said apparatus, in response to said access request.

10. The file transfer apparatus according to claim 2, wherein contents of at least one of said delivery procedure table and said file selection table corresponding to respective ones of said one or more device drivers can be changed arbitraily by external operation.

11. The file transfer apparatus according to claim 2, wherein said data type is indicated by information included in an identifier for specifying the file accessed by said file access means.

12. A computer readable recording medium recording a file transfer program allowing a computer to execute a file transfer method in an apparatus having one or more different device drivers, and one or more different units connected through respective ones of said device drivers, for delivering a file using said device driver corresponding to respective one of said one or more units, a file selection table for each of said one or more device drivers, storing a data type of the file of which delivery is requested by said unit connected to the device driver, a delivery procedure table for each of said one or more device drivers, storing delivery procedures of the file to said unit connected to the device driver, wherein said file transfer file transfer method includes accessing, in a file access step, a file in response to an access request generated in said apparatus, delivering, in a file delivery step, when it is determined for each of said one or more device drivers that the device driver is the one used for delivery of the file accessed in said access step, the file accessed in said access step to said unit connected through said device driver, wherein said file delivery step includes a device driver determining step for determining, for each of said one or more device drivers, based on data type of the file accessed in said file access step, that the device driver is the one used for delivery of the file, wherein, in said device driver determining step, it is determined, for each of said one or more device drivers, when a data type of the file accessed in said file access step is stored in said file selection table, that the device driver is the one used for delivery of the file, and wherein in said file delivery step, in accordance with contents of said delivery procedure table corresponding to that device driver which is determined by said device driver determining step to be the device driver used for delivery of the file accessed in said file access step, the file to said unit connected to the device driver.

13. The file transfer apparatus according to claim 7, wherein said file access means accesses a file inside or outside of said apparatus, in response to said access request.

14. The file transfer apparatus according to claim 7, wherein said data type is indicated by information included in an identifier for specifying the file accessed by said file access means.

15. A file transfer apparatus having one or more different device drivers, and one or more different units connected through respective ones of said device drivers, for delivering a file to respective ones of said one or more units through corresponding said device drivers, comprising:

file access circuitry for accessing a file in response to an access request generated in said apparatus;

file delivery circuitry for delivering, when it is determined for each of said one or more device drivers that the device driver is the one used for delivery of the file accessed by said access circuitry, the file accessed by said access circuitry to said unit connected through the device driver, wherein said file delivery circuitry includes device driver determining circuitry for determining, for each of said one or more device drivers, based on data type of the file accessed by said file access circuitry, that the device driver is the one used for delivery of the file, a file selection table for each of said one or more device drivers, storing said data type of the file of which delivery is required by said unit connected to the device driver; wherein said device driver determining circuitry determines, for each of said one or more device drivers, when data type of the file accessed by said file access circuitry is stored in said file selection table, that the device driver is the one used for the delivery of the file, and a delivery procedure table for each of said one or more device drivers storing procedures of delivery of the file to said unit connected to the device driver; wherein said file delivery circuitry delivers, in accordance with the contents of said delivery procedure table corresponding to that device driver which is determined by said device driver determining circuitry to be the one used for delivery of the file accessed by said file access circuitry, the file to said unit connected to the device driver.

16. The file transfer apparatus according to claim 15, wherein said one or more units include one or more input/output units for inputting/outputting information or one or more storage units for storing information; and said one or more device drivers include one or more input/output device drivers for connecting said one or more input/output units to said file transfer apparatus or one or more storage device drivers for connecting said one or more storage units to said file transfer apparatus.

17. The file transfer apparatus according to claim 16, wherein said delivery procedures of said delivery procedure table corresponding to each of one or more said storage device drivers include a duplication process procedure for duplicating said file to said storage unit connected to the storage device driver; and said delivery procedures of said delivery procedure table corresponding to each of said one or more input/output device drivers include a transfer process procedure for transferring said file to said input/output unit connected to the input/output device driver.

18. The file transfer apparatus according to claim 17, wherein said file delivery circuitry further includes connection determining circuitry for determining whether said input/output unit is connected to said input/output device driver corresponding to that device driver which is determined by said device driver determining circuitry to be the device driver used for delivery of said file, and file saving circuitry for duplicating and saving, when the input/output unit is determined to be not connected by said connection determining circuitry, data related to the file accessed by said file access circuitry to said storage unit connected to said storage device driver, in accordance with said duplication processing procedure corresponding to a prescribed said storage device driver.

19. The file transfer apparatus according to claim 18, wherein the file accessed by said file access circuitry corresponding to said data saved by said file saving circuitry is transferred, when said input/output unit is connected to corresponding each of said one or more input/output device drivers among said one or more device drivers, to said input/output unit using corresponding said transfer processing procedure through the input/output device driver.

20. The file transfer apparatus according to claim 15, wherein said file delivery circuitry further includes application file delivery circuitry for delivering, when said file is delivered, an application file related to processing of the file through the device driver determined by said device driver determining circuitry to said unit connected to the device driver, together with said file as needed.

21. The file transfer apparatus according to claim 20, wherein said file delivery circuitry converts, when said file is delivered, contents or format of said file to prescribed contents or format in advance as needed.

22. The file transfer apparatus according to claim 15, wherein said file access circuitry accesses a file inside or outside of said apparatus, in response to said access request.

23. The file transfer apparatus according to claim 15, wherein contents of at least one of said delivery procedure table and said file selection table corresponding to respective ones of said one or more device drivers can be changed arbitrarily by external operation.

24. The file transfer apparatus according to claim 15, wherein said data type is indicated by information included in an identifier for specifying the file accessed by said file access circuitry.

25. The file transfer apparatus according to claim 20, wherein said file access circuitry accesses a file inside or outside of said apparatus, in response to said access request.

26. The file transfer apparatus according to claim 20, wherein said data type is indicated by information included in an identifier for specifying the first accessed by said file access circuitry.

* * * * *